(12) United States Patent
Svidenko et al.

(10) Patent No.: US 8,924,904 B2
(45) Date of Patent: Dec. 30, 2014

(54) METHOD AND APPARATUS FOR DETERMINING FACTORS FOR DESIGN CONSIDERATION IN YIELD ANALYSIS

(75) Inventors: Vicky Svidenko, San Jose, CA (US); Youval Nehmadi, Modiin (IL); Rinat Shimshi, San Jose, CA (US); Alexander T. Schwarm, Austin, TX (US); Sundar Jawaharlah, Glen Allen, VA (US)

(73) Assignee: Applied Materials, Inc., Santa Clara, CA (US)

( * ) Notice: Subject to any disclaimer, the term of this patent is extended or adjusted under 35 U.S.C. 154(b) by 1047 days.

(21) Appl. No.: 12/154,586

(22) Filed: May 22, 2008

(65) Prior Publication Data

US 2008/0295063 A1 Nov. 27, 2008

Related U.S. Application Data

(60) Provisional application No. 60/931,968, filed on May 24, 2007.

(51) Int. Cl.
*G06F 17/50* (2006.01)

(52) U.S. Cl.
CPC ........ *G06F 17/5081* (2013.01); *G06F 2217/10* (2013.01)
USPC ........................................................ 716/112

(58) Field of Classification Search
USPC ................................. 716/112, 100
See application file for complete search history.

(56) References Cited

U.S. PATENT DOCUMENTS

| | | | |
|---|---|---|---|
| 5,822,218 A * | 10/1998 | Moosa et al. | 716/52 |
| 5,875,027 A | 2/1999 | Ishiguro et al. | |
| 5,971,586 A | 10/1999 | Mori | |
| 6,178,539 B1 * | 1/2001 | Papadopoulou et al. | 716/122 |
| 6,311,139 B1 | 10/2001 | Kuroda et al. | |
| 6,317,859 B1 * | 11/2001 | Papadopoulou | 716/135 |
| 6,389,323 B1 | 5/2002 | Yang et al. | |
| 6,393,602 B1 | 5/2002 | Atchison et al. | |
| 6,496,958 B1 | 12/2002 | Ott et al. | |
| 6,714,885 B1 | 3/2004 | Lee et al. | |
| 6,732,002 B1 | 5/2004 | Weiner et al. | |
| 6,738,954 B1 * | 5/2004 | Allen et al. | 716/56 |
| 6,901,564 B2 | 5/2005 | Stine et al. | |
| 6,918,101 B1 * | 7/2005 | Satya et al. | 716/112 |
| 6,948,141 B1 | 9/2005 | Satya et al. | |
| 7,174,521 B2 | 2/2007 | Stine et al. | |
| 7,280,945 B1 | 10/2007 | Weiner et al. | |
| 7,356,800 B2 | 4/2008 | Stine et al. | |

(Continued)

OTHER PUBLICATIONS

Allan, Gerard, "Design for Yield Interface to Slam IC Layout Editor," PRWeb, Jan. 9, 2004, (3 pages).

(Continued)

*Primary Examiner* — Suchin Parihar
(74) *Attorney, Agent, or Firm* — Blakely, Sokoloff, Taylor & Zafman LLP

(57) ABSTRACT

Embodiments of the present invention provide methods and apparatuses for determining factors for design consideration in yield analysis of semiconductor fabrication. In one embodiment, a computer-implemented method for determining factors for design consideration in yield analysis of semiconductor fabrication includes obtaining a geometric characteristic of a defect on a chip and obtaining design data of the chip, where the design data is associated with the defect. The method further includes determining a criticality factor of the defect based on the geometric characteristic and the design data, and outputting the criticality factor.

18 Claims, 24 Drawing Sheets

(56) References Cited

U.S. PATENT DOCUMENTS

| | | | |
|---|---|---|---|
| 7,485,548 B2 | 2/2009 | Deshmukh et al. | |
| 7,570,796 B2 | 8/2009 | Zafar et al. | |
| 7,584,077 B2 | 9/2009 | Bergman Reuter et al. | |
| 7,673,262 B2 | 3/2010 | Stine et al. | |
| 7,694,244 B2 | 4/2010 | Chan et al. | |
| 7,760,347 B2 | 7/2010 | Nehmadi et al. | |
| 7,877,722 B2 * | 1/2011 | Duffy et al. | 716/55 |
| 7,937,179 B2 | 5/2011 | Shimshi et al. | |
| 7,962,864 B2 | 6/2011 | Nehmadi et al. | |
| 2001/0029597 A1 * | 10/2001 | Miwa | 716/4 |
| 2002/0143483 A1 | 10/2002 | Ono et al. | |
| 2003/0204588 A1 | 10/2003 | Peebles et al. | |
| 2004/0115541 A1 * | 6/2004 | Yamaguchi et al. | 430/30 |
| 2004/0153979 A1 * | 8/2004 | Chang | 716/4 |
| 2005/0071788 A1 * | 3/2005 | Bickford et al. | 716/4 |
| 2005/0108669 A1 * | 5/2005 | Shibuya | 716/9 |
| 2005/0132322 A1 * | 6/2005 | Inoue | 716/19 |
| 2006/0190222 A1 * | 8/2006 | Allen et al. | 703/2 |
| 2006/0190223 A1 * | 8/2006 | Allen et al. | 703/2 |
| 2006/0203412 A1 | 9/2006 | Schillert et al. | |
| 2006/0269120 A1 | 11/2006 | Nehmadi et al. | |
| 2006/0277506 A1 * | 12/2006 | Stine et al. | 716/4 |
| 2007/0052963 A1 | 3/2007 | Orbon et al. | |
| 2007/0061773 A1 | 3/2007 | Ye et al. | |
| 2007/0136714 A1 * | 6/2007 | Cohn et al. | 716/13 |
| 2007/0156379 A1 | 7/2007 | Kulkarni et al. | |
| 2007/0162242 A1 | 7/2007 | Singh et al. | |
| 2007/0168895 A1 * | 7/2007 | Ikeuchi | 716/4 |
| 2007/0212798 A1 * | 9/2007 | Deshmukh et al. | 438/5 |
| 2007/0240085 A1 * | 10/2007 | Bickford et al. | 716/4 |
| 2007/0256040 A1 * | 11/2007 | Allen et al. | 716/4 |
| 2007/0294648 A1 * | 12/2007 | Allen et al. | 716/4 |
| 2008/0127004 A1 * | 5/2008 | Allen et al. | 716/4 |
| 2008/0140330 A1 * | 6/2008 | Morioka et al. | 702/81 |
| 2008/0148216 A1 | 6/2008 | Chan et al. | |
| 2008/0163140 A1 | 7/2008 | Fouquet et al. | |
| 2008/0178137 A1 * | 7/2008 | Papadopoulou et al. | 716/13 |
| 2008/0209365 A1 * | 8/2008 | Riviere-Cazaux | 716/4 |
| 2008/0295047 A1 * | 11/2008 | Nehmadi et al. | 716/4 |
| 2008/0295048 A1 * | 11/2008 | Nehmadi et al. | 716/4 |
| 2009/0100386 A1 * | 4/2009 | Allen et al. | 716/2 |
| 2009/0237104 A1 | 9/2009 | Tsuchida et al. | |

OTHER PUBLICATIONS

Allan, Gerard, "Standard and Custom Cell Yield and Critical Area Analysis via the Web," PRWeb, Apr. 25, 2004, (2 pages).

Allan, Gerard A., "Targeted Layout Modifications for Semiconductor Yield/Reliability Enhancement," IEEE Transactions on Semiconductor Manufacturing, vol. 17, No. 4, Nov. 2004, pp. 573-581 (9 pages).

Barberan, Sandrine, et al., "Management of Critical Areas and Defectivity Data for Yield Trend Modeling," IEEE International Symposium, Nov. 1998, pp. 17-25, (9 pages).

Levasseur, Sandra, et al., "Application of a Yield Model Merging Critical Areas and Defectivity Data to Industrial Products," Defect and Fault Tolerance in VLSI Systems, Proceedings, 1997 IEEE International Symposium on October, pp. 11-19, (9 pages).

McGrath, Dylan, Partnering Startups Claim DFM Sign-off Tool, EE/Times News & Analysis, Jan. 19, 2006, (2 pages).

McGrath, Dylan, Startup Takes First Step to Integrating Yield analysis Design, EE/Times News & Analysis, Jul. 11, 2005, (2 pages).

Rencher, Mark, et al. "GDSII Yield Signoff Methods," Design for Yield, 2004, pp. 28-35 (8 pages).

Svidenko, Vicky et al. "Dynamic Defect-Limited Yield Prediction by Criticality Factor," ISSM Paper: YE-O-157, Conference Proceedings, Santa Clara, California, Oct. 15-17, 2007, (4 pages).

Allan, Gerard A., "EYES User Manual", *Predictions Software Ltd.*, Version 1.3, Nov. 18, 2002, 32 pages.

Allan, Gerard A., "PEYE-CAA User Manual", *Predictions Software Ltd.*, Sep. 1, 2003, 17 pages.

* cited by examiner

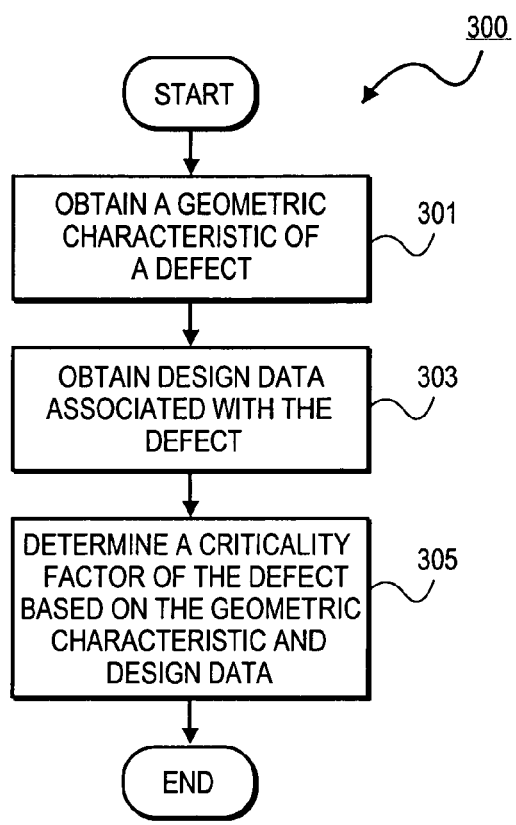
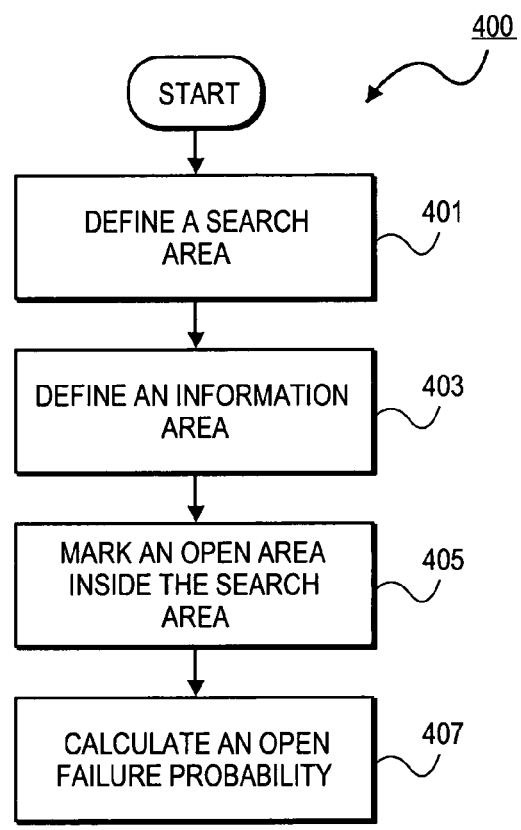
FIG. 3
FIG. 4

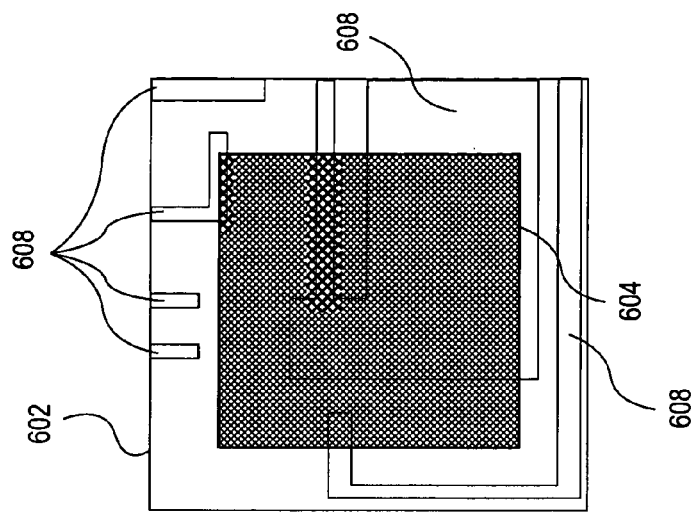
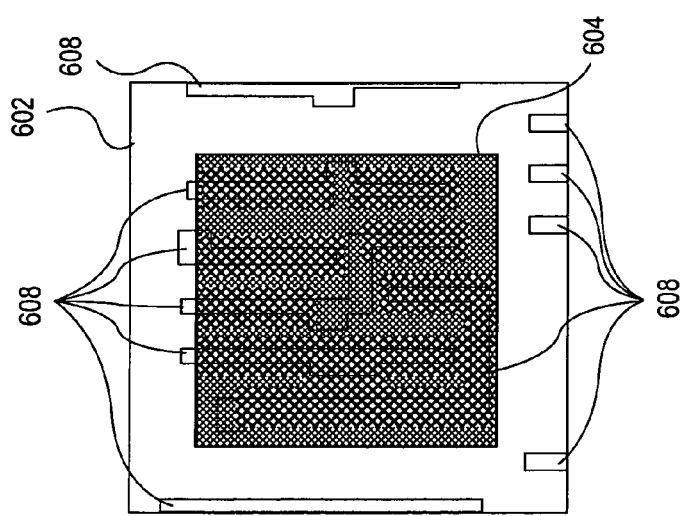
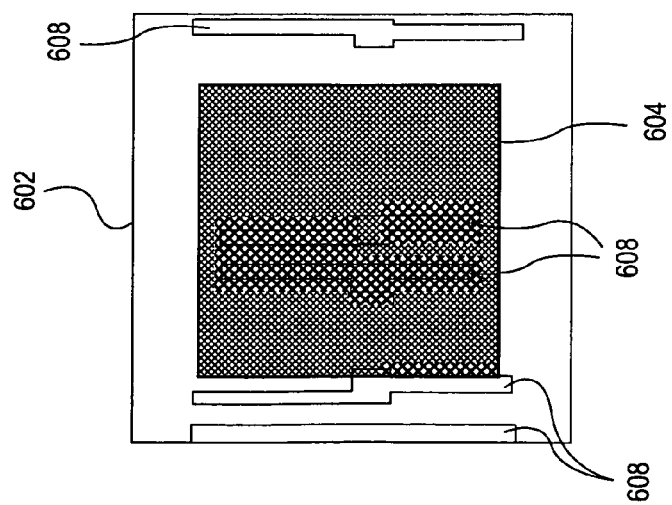

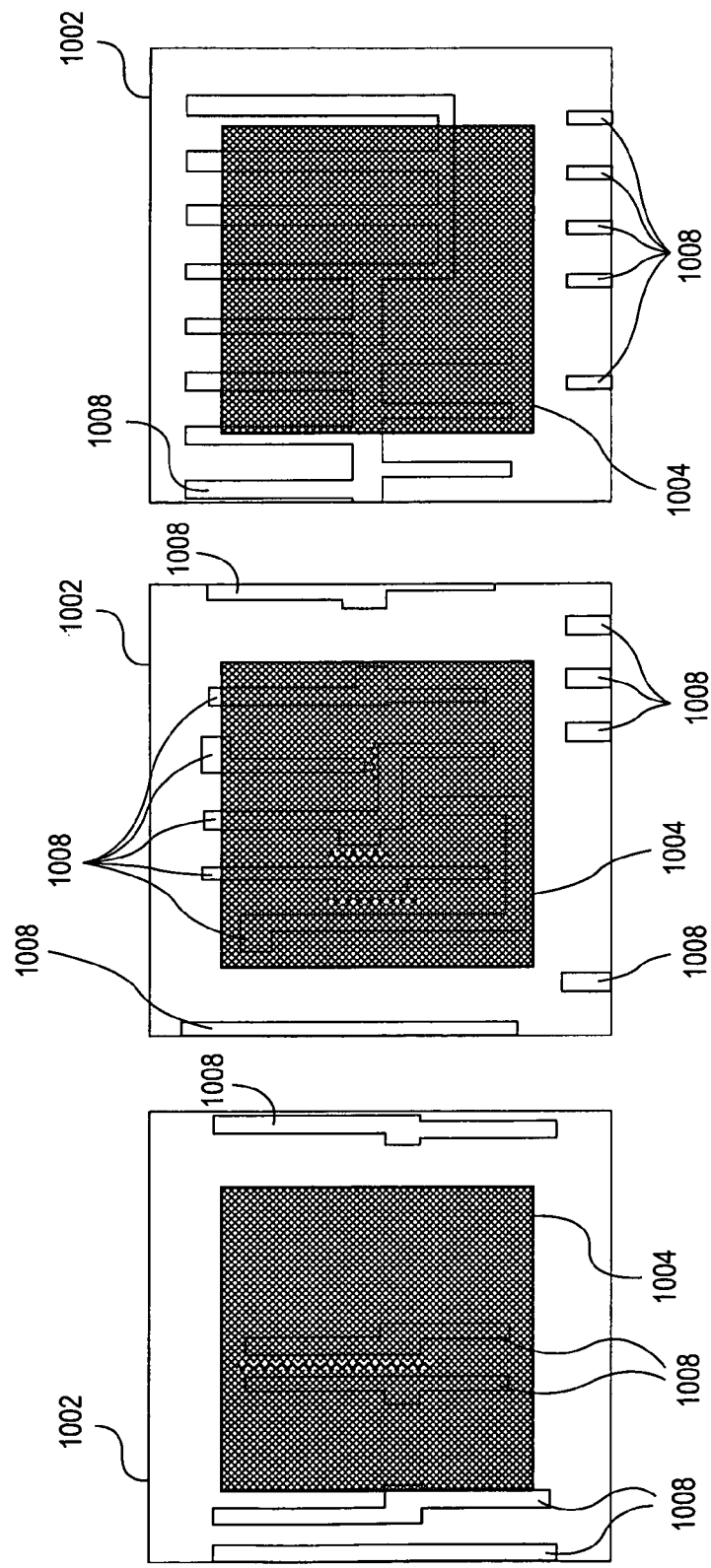

Criticality Factor: 0.07619   Open Probability 0.076186   Short Probability 0
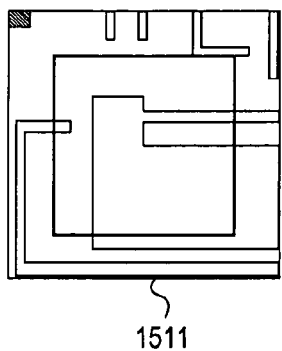 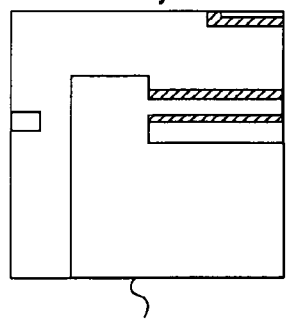 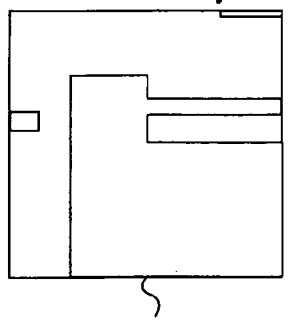
1511   1512   1513
FIG. 15A
Criticality Factor: 0.64838   Open Probability 0.64402   Short Probability 0.012252
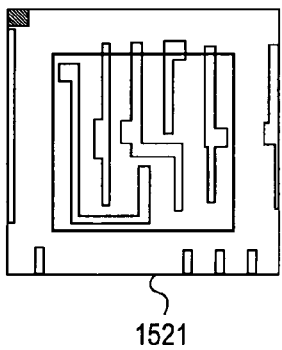 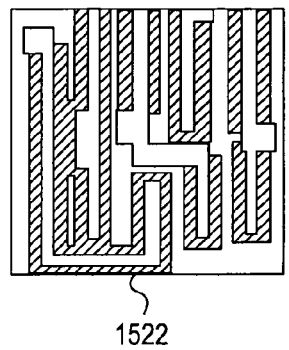 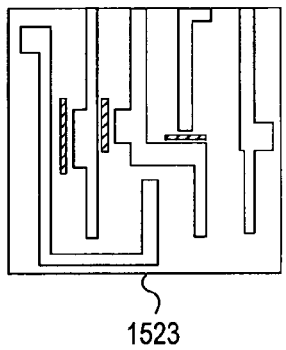
1521   1522   1523
FIG. 15B
Criticality Factor: 0.55997   Open Probability 0.54912   Short Probability 0.024059
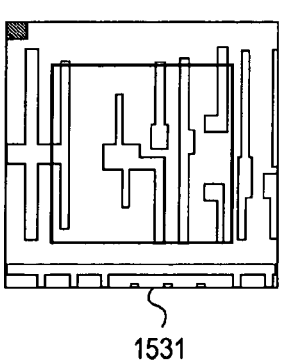 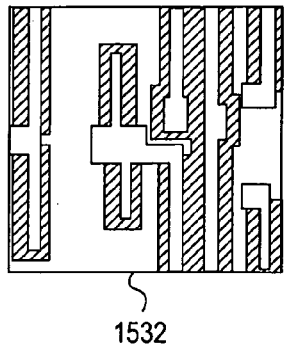 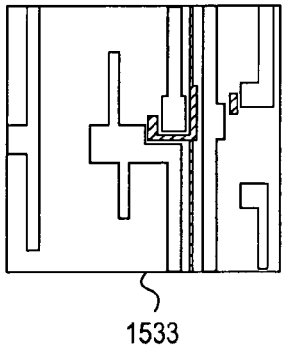
1531   1532   1533
FIG. 15C

Criticality Factor: 0.53473
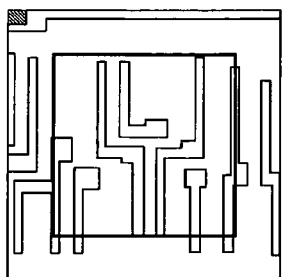
1541
Open Probability 0.52261
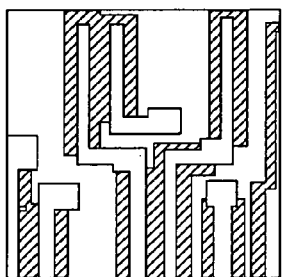
1542
Short Probability 0.025395
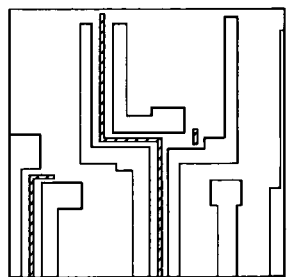
1543
FIG. 15D
Criticality Factor: 0.79024
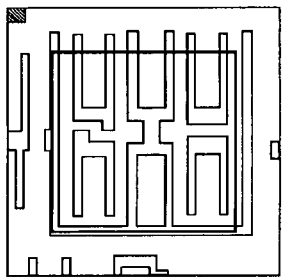
1551
Open Probability 0.78102
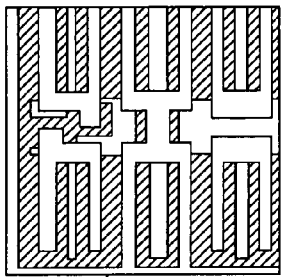
1552
Short Probability 0.042103
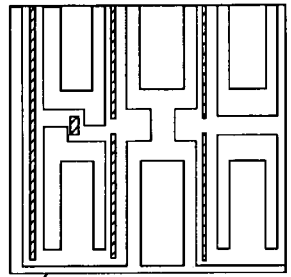
1553
FIG. 15E
Criticality Factor: 0.65590
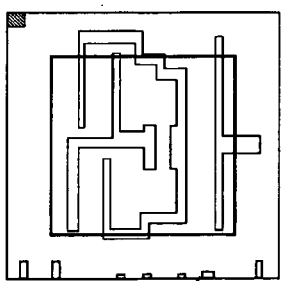
1561
Open Probability 0.65382
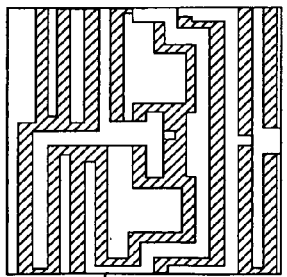
1562
Short Probability 0.0060147
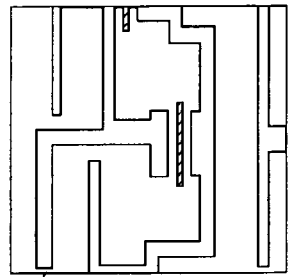
1563
FIG. 15F

Criticality Factor: 0.63088    Open Probability 0.63088    Short Probability 0
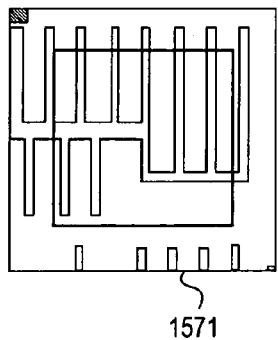 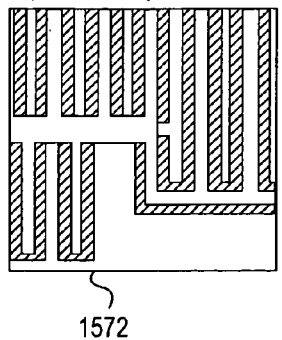 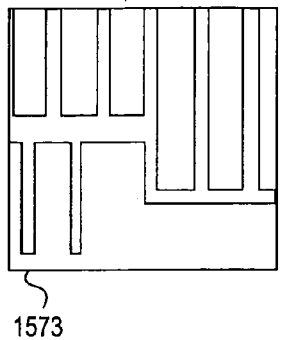
1571    1572    1573
FIG. 15G
Criticality Factor: 0.23235    Open Probability 0.23235    Short Probability 0
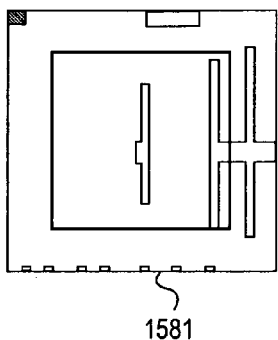 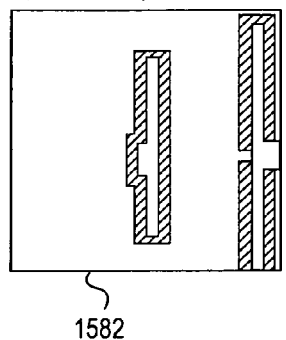 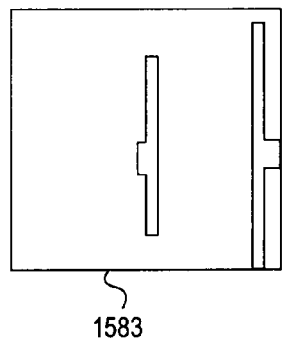
1581    1582    1583
FIG. 15H
Criticality Factor: 0.62700    Open Probability 0.61885    Short Probability 0.021386
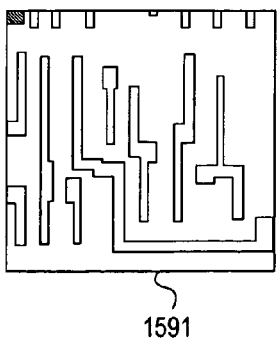 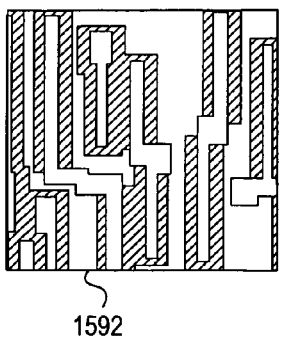 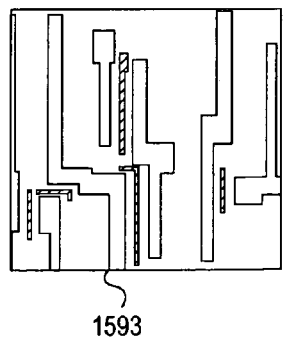
1591    1592    1593
FIG. 15I

Pattern Boundary Length = 15.99μ
Search Area = 4μ²
Pattern Density = 3.9578μ/μ²
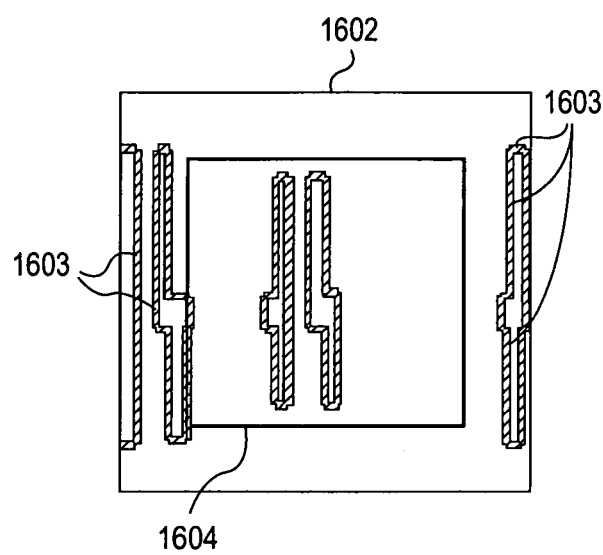
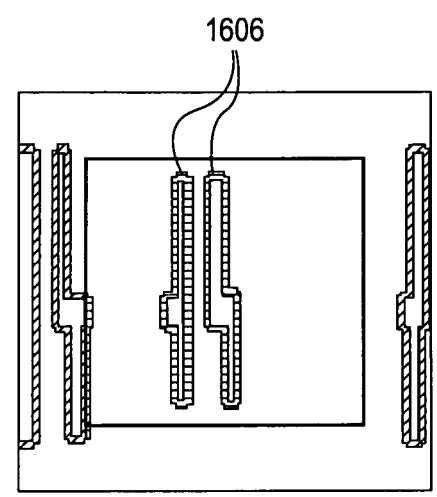
FIG. 16A          FIG. 16B

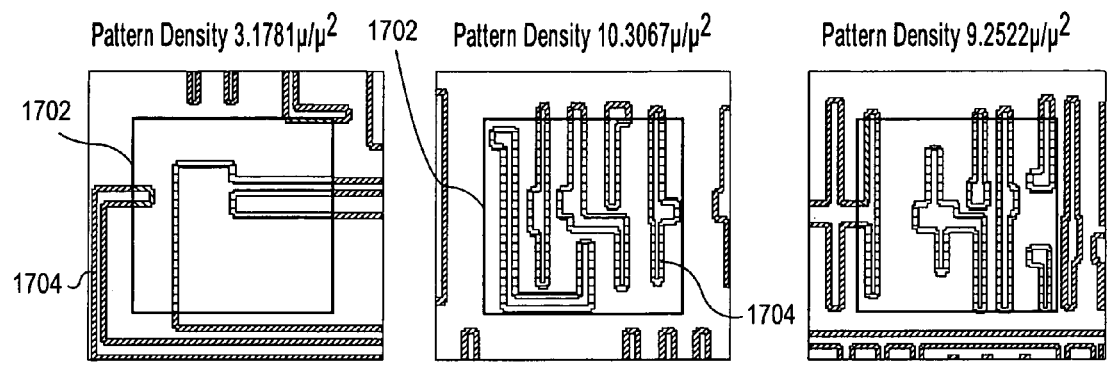
FIG. 17A  FIG. 17B  FIG. 17C
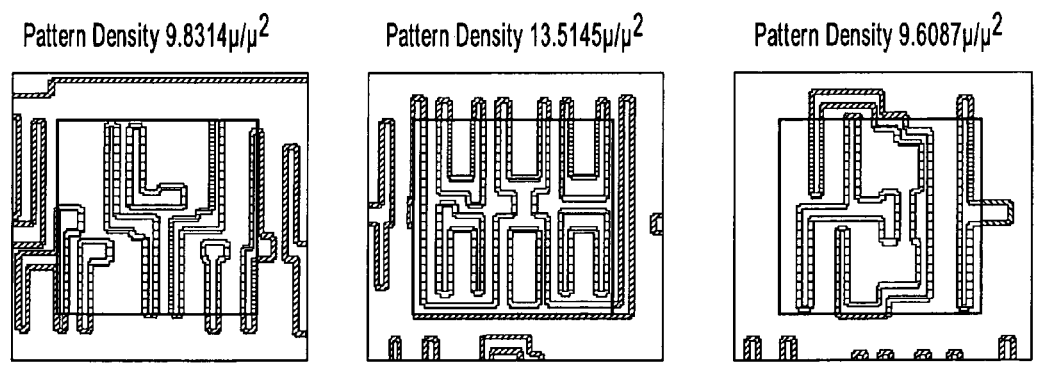
FIG. 17D  FIG. 17E  FIG. 17F

Pattern Density 9.4379μ/μ²

Pattern Density 3.3935μ/μ²

Pattern Density 10.2547μ/μ²

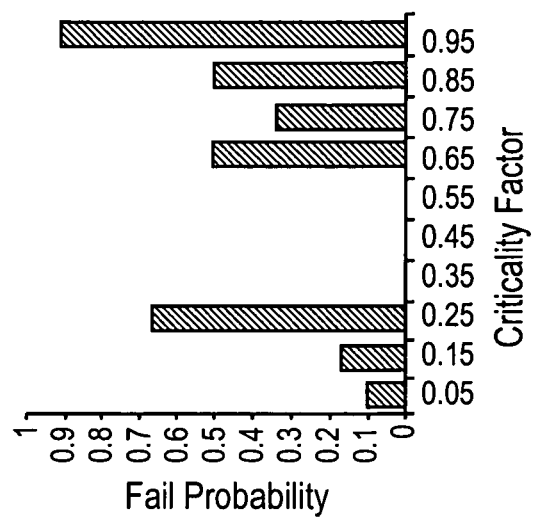
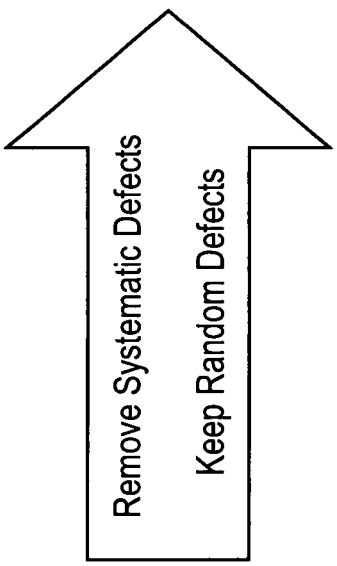
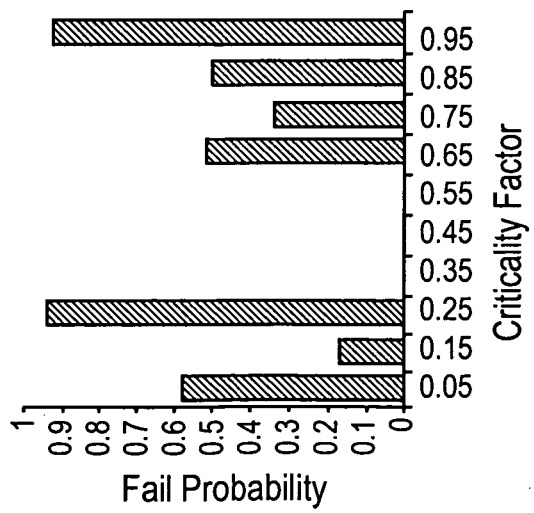
FIG. 20

METHOD AND APPARATUS FOR DETERMINING FACTORS FOR DESIGN CONSIDERATION IN YIELD ANALYSIS

RELATED APPLICATIONS

This application claims the priority benefit of U.S. Provisional Application No. 60/931,968, filed on May 24, 2007, which is incorporated herein by reference.

FIELD OF THE INVENTION

The present invention relates to yield analysis for semiconductor fabrication, and more specifically to determining factors to be used in yield analysis for design elements to be considered.

BACKGROUND OF THE INVENTION

The fabrication of integrated circuits is an extremely complex process that may involve hundreds of individual operations. In view of the device and interconnect densities required in integrated circuits, it is imperative that the manufacturing processes be carried out with utmost precision and in a way that minimizes defects.

Yield analysis is performed in order to correct problems in manufacturing processes, and in order to plan, during the manufacturing phase, wafer starts appropriately. It is highly desirable to detect problems early in the design phase through yield analysis due to the multitude and complexity of process steps and their associated cost.

Currently, designers use yield prediction software to decide which design layout alternative will produce a better yield, and thus be printed, and to decide how many wafers to put inline, i.e., adjust the number of wafer starts for production per product based on real inline data to meet the yielding die commitments. Existing software for yield analysis, however, assumes that the likelihood of a defect to occur on different design elements is the same. In other words, design elements' contribution to causing defects is not substantially reflected in the existing yield analysis software.

BRIEF DESCRIPTION OF THE DRAWINGS

The present invention is illustrated by way of example and not limitation in the figures of the accompanying drawings, in which like references indicate similar elements and in which:

FIG. 3 is a flow diagram of one embodiment of a method 300 for determining factors for design consideration in yield analysis;

FIG. 4 is a flow diagram of an exemplary CF algorithm in accordance with the invention;

FIGS. 6A-6C illustrate examples of the open failure probability verification experiment;

FIGS. 10A-10C illustrate examples of the short failure probability verification experiment;

FIGS. 15A-15I shows exemplary GDS clips with calculation results of open failure probability, short failure probability and criticality factor, in accordance with embodiments of the invention;

FIGS. 16A-16B illustrate an exemplary pattern density calculation in accordance with one embodiment of the invention;

FIGS. 17A-17I show exemplary GDS clips with calculation results of pattern density in accordance with embodiments of the invention;

FIG. 20 shows the correlation between fail probability and CF in accordance with the methodology illustrated in FIG. 18;

DETAILED DESCRIPTION

Figure 1:
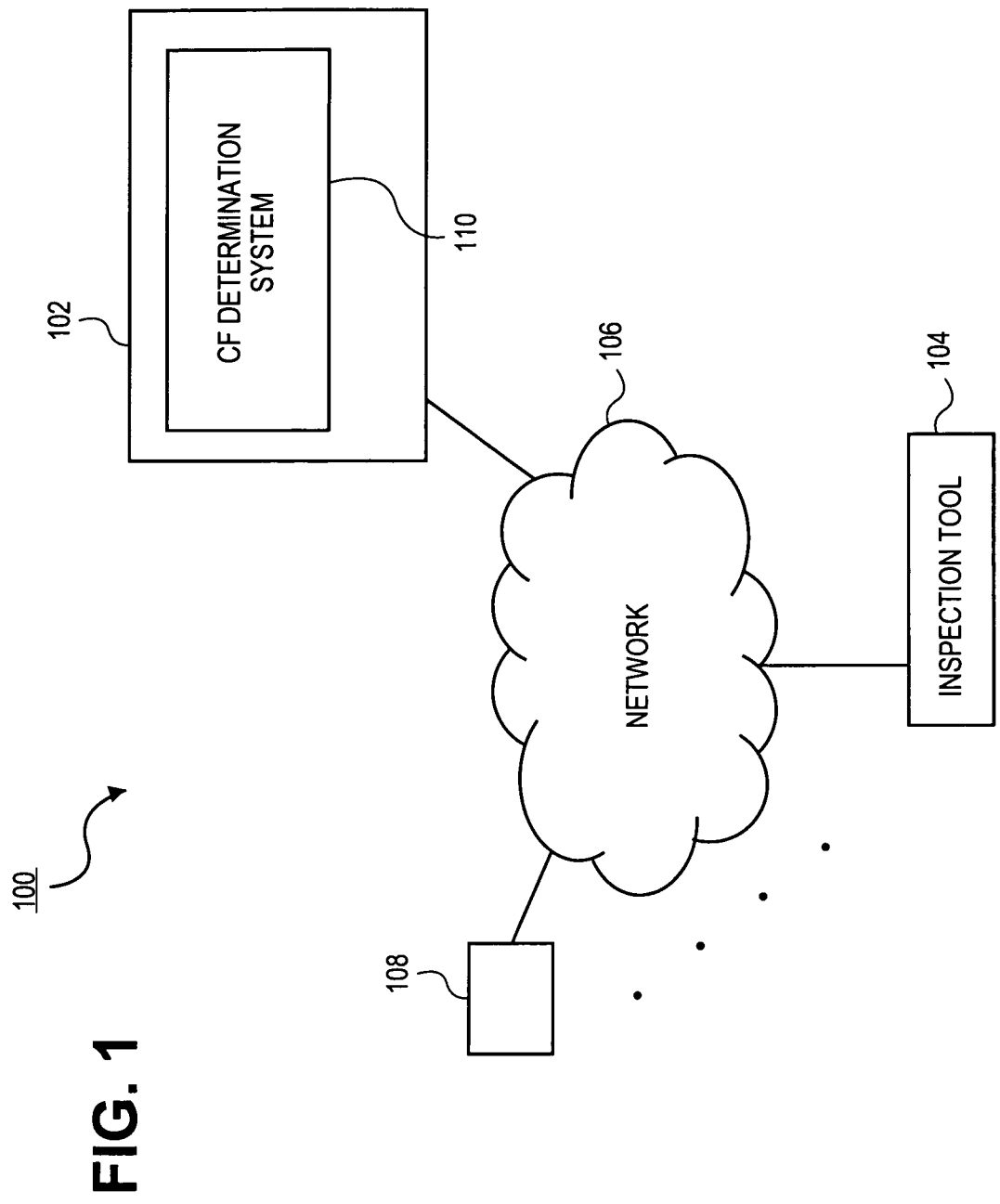
FIG. 1 is a block diagram of an exemplary network architecture in which embodiments of the present invention may operate.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy discs, optical discs such as CDs, DVDs and BDs (Blu-Ray Discs), and magnetic-optical discs, read-only memories (ROMs), random access memories (RAMs), EPROMs, EEPROMs, magnetic or optical cards, or any type of media suitable for storing electronic instructions, currently available or to be developed in the future.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"), random access memory ("RAM"), magnetic disc storage medium, optical disc storage medium, flash memory device, etc.

Embodiments of the present invention provide methods and apparatuses for determining factors for design consideration in yield analysis of semiconductor fabrication. In one embodiment, a criticality factor is calculated using a geometric characteristic of a defect on a chip and design data on the chip. The criticality factor may indicate a likelihood of the defect to cause a failure of the chip. A pattern density of the chip around the defect may also be determined based on the geometric characteristics.

In one embodiment, obtaining the design data includes defining a search area where the defect is located on the chip and marking an open area inside the search area that indicates an area where the defect may cause an open failure. In one embodiment, determining the criticality factor involves calculating an open failure probability. The open failure probability is the ratio between the open area and the search area. Marking the open area may include identifying pattern elements larger than the defect in the search area, subtracting the identified pattern elements from the original pattern elements in the search area and identifying an area that covers the remaining pattern elements as the open area.

In another embodiment, obtaining the design data includes defining a search area indicating an area where the defect is located on a chip, and marking a short area indicating an area where the defect can cause a short failure inside the search area. Determining the criticality factor may involve calculating a short failure probability, where the short failure probability is the ratio between the short area and the search area. Marking the short area may include labeling all the separate polygons in an area covering the search area, enlarging all the labeled separate polygons by a dimension related to the reported defect size until neighboring polygons of the labeled separate polygons are overlapped, and identifying the overlapped area as the short area.

In yet another embodiment, the criticality factor may be calculated based on both the open failure probability and the short failure probability.

The criticality factor and/or the pattern density can be used in yield analysis for semiconductor production. By using these factors, design elements can be considered in yield analysis for semiconductor production, and thereby more precise and comprehensive analysis results can be obtained.

FIG. 1 is a block diagram of an exemplary network architecture 100 in which embodiments of the present invention may operate. The network architecture 100 may include a host system 102, an inspection tool 104 and a network 106.

The host system 102 may be part of an organization's network and may be able to perform yield analysis for semiconductor production. Alternatively, the host system 102 may send information to another system for yield analysis for semiconductor production. Yet alternatively, the host system 102 may be able to both perform yield analysis and send information to another system for performing additional yield analysis for semiconductor production.

The host system 102 may be coupled to the inspection tool 104 via the network 106. The network 106 may be a public network (e.g., Internet) or a private network (e.g., Ethernet, a Local Area Network (LAN), or a corporate intranet). The inspection tool 102 may inspect semiconductor chips and send the inspection result to the host system 102. The host system 102 may also communicate with other systems 108 that may include, for example, a computer server, a computer system for additional yield analysis, etc.

In one embodiment, the host system 102 hosts a Criticality Factor (CF) determination system 110. The CF determination system 110 determines a CF based on one or more geometric characteristics and design data associated with a defect. In one embodiment, the CF determination system 110 determines a pattern density as well.

It should be noted that although the network architecture of FIG. 1 illustrates the CF determination system 110 as part of the host system 102, it is not a requirement. Instead, the CF determination system 110 may reside on the inspection tool 104 or any of the other systems 108. In addition, the CF determination system 110 can operate on more than one machine and perform additional functionality not described herein.

Figure 2:
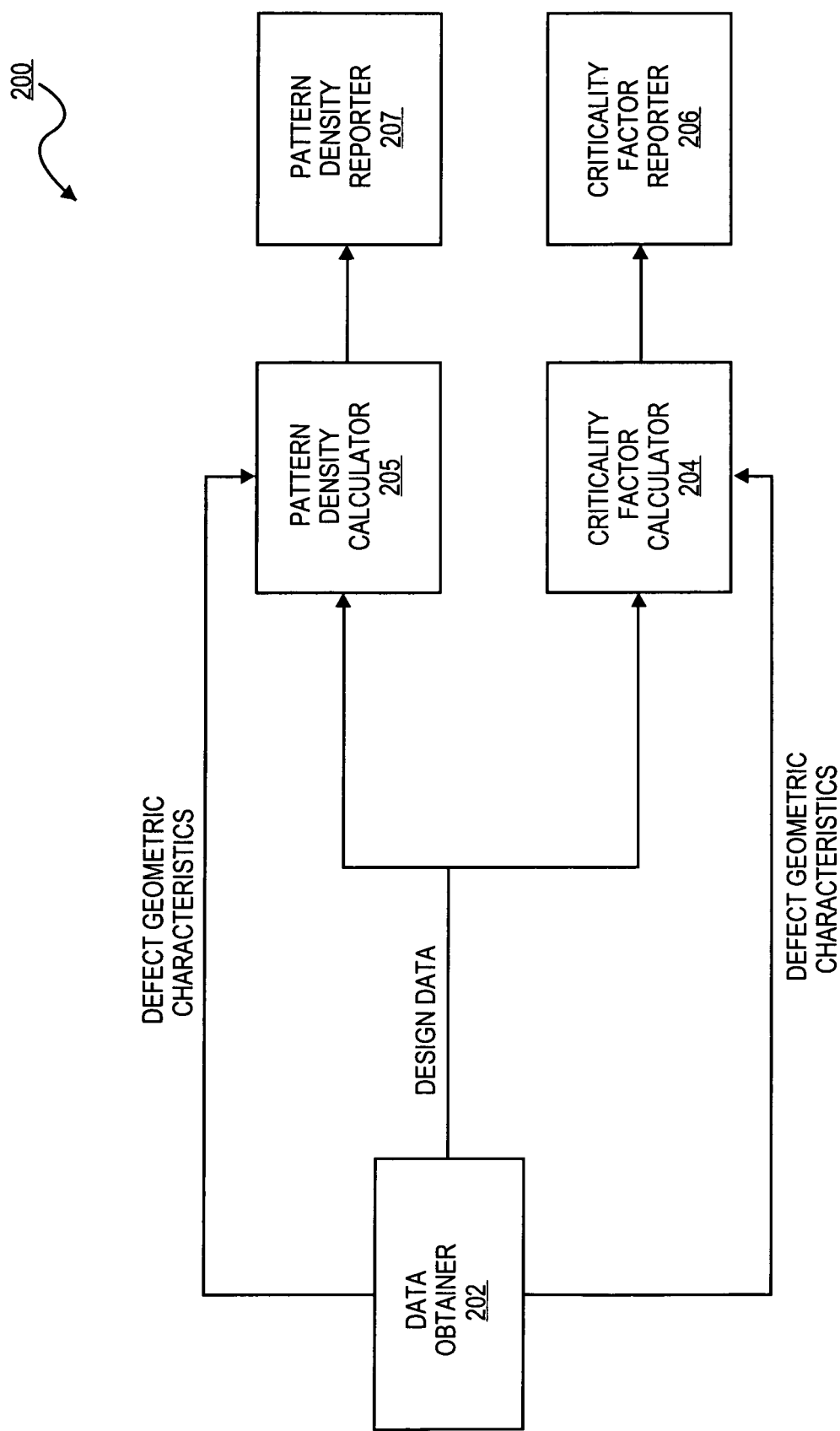
FIG. 2 is a block diagram of one embodiment of a CF determination system 200 for calculating a criticality factor of an individual defect and a pattern density.

FIG. 2 is a block diagram of one embodiment of a CF determination system 200 for calculating a CF of an individual defect and a pattern density. The CF determination system 200 includes a data obtainer 202, a CF calculator 204, a pattern density calculator 205, a CF reporter 206 and a pattern density reporter 207. The CF calculator 204 and the CF reporter 206, as well as the pattern density calculator 205 and the pattern density reporter 207, may reside on the same computer. The data obtainer 202 may also be part of the same machine or may reside on a different machine and may communicate with the CF calculator 204 and the pattern density calculator 205 via a network (e.g., a private network or a public network).

The data obtainer 202 provides one or more geometric characteristics of individual defects and/or design data according to the present invention. The data obtainer 202 may include an inspection tool that inspects semiconductor chips during or after fabrication. The inspection tool may examine semiconductor chips, for example, using dark field microscopy, bright field microscopy, e-beam technology, etc. Alternatively, the inspection tool may be a device physically separated from the data obtainer 202. In this case, the data obtainer 202 may communicate directly or via a network with the inspection tool to receive inspection information necessary for the geometric characteristics of individual defects and design data. The defects, geometric characteristics and design data will be explained in more detail below.

The CF calculator 204 determines the CF for the defect based on the geometric characteristics and/or the design data provided by the data obtainer 202. Exemplary CF algorithms used by the CF calculator 204 to determine the CF will be discussed in more detail below.

The CF reporter 206 reports the calculated CF to various components of a yield analysis system such as a design stage yield prediction component, an inline yield analysis and prediction component, and a scanning electron microscope (SEM) review component. In addition, the CF reporter 206 may report the CF determined by the CF calculator 204 to any other components or systems, which may use the CF for any other purposes. The CF reporter 206 may communicate with these components directly or via a network (e.g., a private network or a public network).

The pattern density calculator 205 calculates a pattern density for the defect based on the geometric characteristics and/or the design data provided by the data obtainer 202. An exemplary algorithm used by the pattern density calculator 205 will be discussed in more detail below.

The pattern density reporter 207 reports the calculated pattern density to various components of a yield analysis system such as a design stage yield prediction component, an inline yield analysis and prediction component and an SEM review component. In addition, the pattern density reporter 207 may report pattern densities of individual defects to any other components or systems, which may use the pattern densities for any other purposes. The pattern density reporter 207 may communicate with these components directly or via a network (e.g., a private network or a public network).

In another embodiment, the CF determination system 200 may not include the pattern density calculator 205 and the pattern density reporter 207, and may not determine pattern densities of defect locations.

Defects can include visible defects reported by the inspection tool. The visible defects can be systematic or random. Geometric characteristics of a defect may include the size and location of an individual defect. The size of a defect may be expressed with x and y sizes of the defect, as reported by the inspection tool. The x and y sizes may have been adjusted using an analytic function of relation between an estimated defect size as reported by inspection tool and the actual defect size as measured in SEM. The location of the defect may be expressed with x and y coordinates using Computer-Aided Design (CAD). The location expression may further include a die index in which the defect was found. The die index may be expressed with x and y coordinates. 100521 FIG. 3 is a flow diagram of one embodiment of a method 300 for determining factors for design consideration in yield analysis of semiconductor production. The method 300 is performed by processing logic that may comprise hardware (circuitry, dedicated logic, etc.), software (such as is run on a general purpose computer system or a dedicated machine), or a combination of both. In one embodiment, the method 300 is performed by a CF determination system (e.g., the CF determination system 200 of FIG. 2).

Referring to FIG. 3, processing logic obtains a geometric characteristic of a defect on a chip (block 301) and the chip's design data associated with the defect (block 303). Based on the geometric characteristics and the design data obtained, the processing logic determines a criticality factor of the defect (block 305). Exemplary CF algorithms will be discussed in more detail below in conjunction with FIGS. 4, 8 and 12.

FIG. 4 is a flow diagram of an exemplary CF algorithm 400 in accordance with one embodiment of the invention. The algorithm 400 is performed by processing logic that may comprise hardware (circuitry, dedicated logic, etc.), software (such as is run on a general purpose computer system or a dedicated machine), or a combination of both. In one embodiment, the algorithm 400 is performed by a CF determination system (e.g., the CF determination system 200 of FIG. 2).

Referring to FIG. 4, processing logic determines an open failure probability for a defect as a criticality factor. The CF algorithm defines a search area in which a defect is found on a chip (block 401). A defect may indicate a fault as reported by an inspection tool. The search area covers the defect and can be represented as using coordinates, for example, SearchArea (Ax, Ay). The processing logic defines an information area (block 403). An information area may be the CAD area used for defect analysis and may be represented using coordinates, for example, InformationArea (Ix, Iy). In this embodiment, the defined information area is slightly larger than the search area defined at block 401 to avoid edge effects in calculations. The CF algorithm marks an open area inside the search area (block 405). An open area may indicate total area of all locations inside the search area in which the defect would cause an open failure and can be represented as OpenArea ($nm^2$). An open failure as a killer failure of the chip means a break in connection between two portions of the pattern on a chip that shall be connected. After marking the open area, the CF algorithm calculates an open failure probability (block 407). An open failure probability may indicate a probability of a defect with a given defect size to cause an open failure of the circuitry on which the defect was located. An open failure probability can be represented as OpenProbability ($P_o$).

Figure 5D:
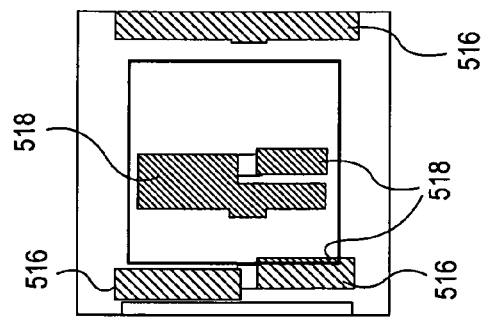
FIGS. 5A-5D illustrate an exemplary open area calculation in accordance with one embodiment of the invention.
Figure 5C:
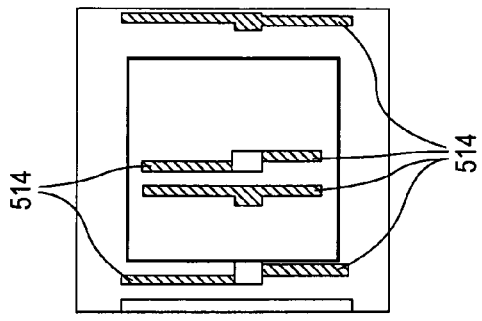
Figure 5B:
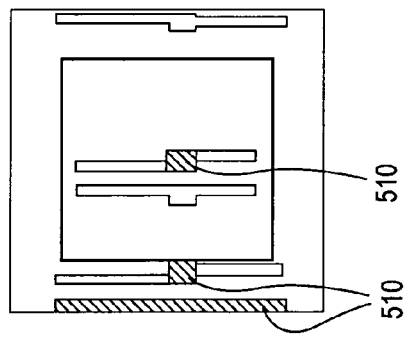
Figure 5A:
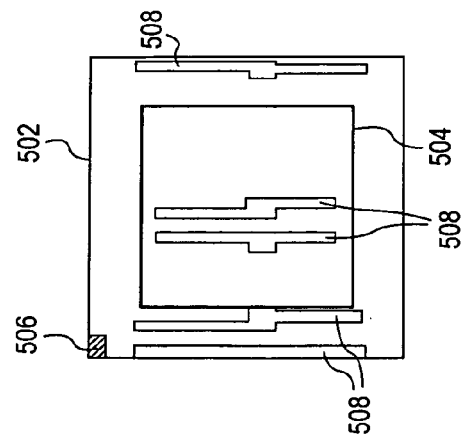

An example of marking an open area at block 405 shown in FIG. 4 will be discussed in more detail below in conjunction with FIGS. 5A-5D. FIG. 5A shows a pattern with a defect reported in its proximity. The largest boundary rectangle represents an information area 502. The thick-line rectangle inside the largest boundary rectangle represents a search area 504. The small rectangle placed on the upper left corner of the largest boundary rectangle indicates the size of a defect 506. The search area 504 is derived from the location inaccuracy of the inspection tool in locating the defect. The defect is located at a point in the search area 504. The polygons 508 inside the information area 502 indicate the pattern that is part of a circuit formed on a chip (not shown). The term "chip" as used herein includes a chip, die, wafer or any other semiconductor product.

For marking an open area in the search area 504, the processing logic performs an analysis on all the visible areas of the clip, which is, in this embodiment, the information area 502, to avoid edge effects. But the final result of the analysis may be extracted only from the search area 504. The open area is an area in which an open failure would occur. An open failure is a killer failure of the chip, e.g., a break in connection between two portions of the polygons 508 that shall be connected.

In this embodiment, a morphological open analysis is performed with erosion followed by dilation of the original clip, which reveals pattern elements larger than the defect 506. The morphological open analysis regards such pattern elements as not being prone to an open failure by the defect. The hatched rectangles 510 in FIG. 5B indicate the pattern elements that have a size that is larger than the size of the defect 506.

Accordingly, a subtraction of the opening result (hatched rectangles 510 in FIG. 5B) from the original image (un-hatched polygons 508 in FIG. 5A) reveals pattern elements that are prone to open failure by the defect 506. Referring to FIG. 5C, the hatched polygons 514 indicate the subtraction result, i.e., the remaining areas prone to open failure by the defect 506.

A dilation of the previous result enlarges the hatched polygons 514, marking additional areas around the hatched polygons 514, where the defect 506 can cause an open failure. The dilated result is shown as the hatched polygons 516 & 518 in FIG. 5D. However, only the hatched portions 518 inside the search area 504 are labeled as an open area. All erosion and dilation operations described above use a structuring element with dimensions related to the defect size.

An open failure probability can be determined based on the marked open area, i.e., using the open area and the search area. According to this CF algorithm, the open failure probability is calculated as the ratio between the open area and the search area. In one embodiment, the ratio between the open area and the search area means the ratio of the area of the open area to the area of the search area. In the illustrated example in FIG. 5D, the open probability=0.26.

In order to verify whether the calculated open probability is meaningful (whether the CF algorithm is useful), a simulation is employed in which a defect of the same size is thrown 10,000 times in a random location within a search area around 10 different clips of Graphic Display System (GDS). If it happens to completely cover some pattern element, it is considered an open failure, i.e., a killer failure. The ratio between the throws resulting in open failures and the total number of throws will be compared to the result obtained above by the calculation.

FIGS. 6A, 6B & 6C illustrate examples of the open failure probability verification experiment. Referring to FIGS. 6A, 6B & 6C, each of the thick-line rectangles 604 represents a search area. Each of the largest boundary rectangles 602 represents an information area for each corresponding search area. The polygons 608 in each information area represent the pattern on a chip (not shown). Each of thin-line Xs indicates a random location of a simulated defect, and each of thick-line Xs indicates a location in which the simulated defect could cause an open failure. In other words, all of the thick-line Xs in each search area collectively indicate an open area in which the defect could cause an open failure.

Figure 7:
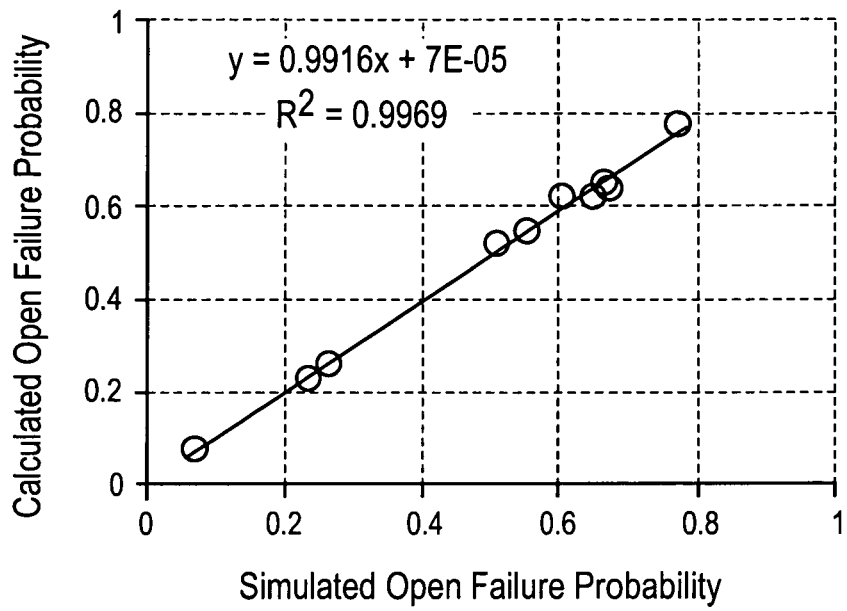
FIG. 7 shows the results of the CF algorithm verification discussed with FIG. 4.

FIG. 7 shows the results of the CF algorithm verification in accordance with one embodiment of the present invention. Calculated open failure probability is plotted as a function of simulated open failure probability. The correlation between the calculated open failure probability and the simulated open failure probability is very strong as shown in FIG. 7.

Figure 8:
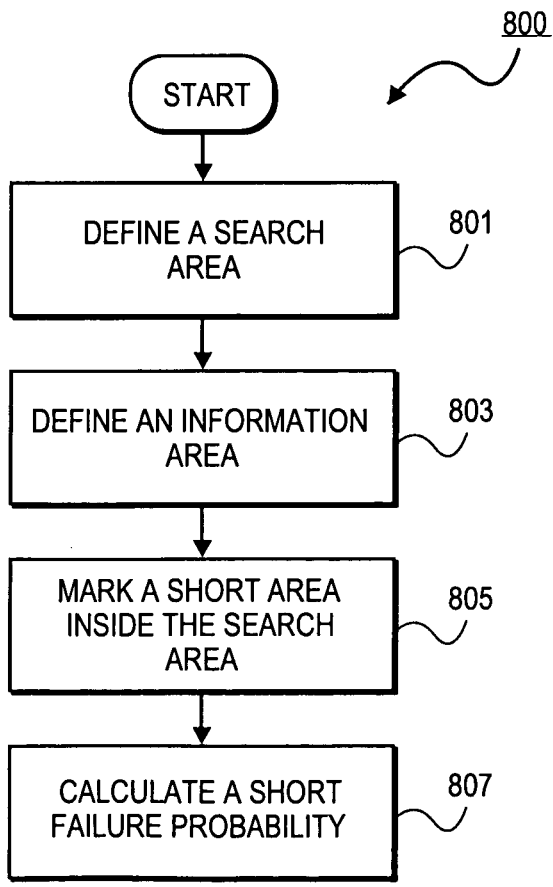
FIG. 8 is a flow diagram of another exemplary CF algorithm in accordance with one embodiment of the invention.

Another exemplary CF algorithm determines a short failure probability as a criticality factor for a defect. FIG. 8 is a flow diagram of another exemplary CF algorithm 800 in accordance with one embodiment of the invention. The algorithm 800 is performed by processing logic that may comprise hardware (circuitry, dedicated logic, etc.), software (such as is run on a general purpose computer system or a dedicated machine), or a combination of both. In one embodiment, the algorithm 800 is performed by a system (e.g., the CF determination system 200 of FIG. 2).

Referring to FIG. 8, processing logic defines a search area in which a defect is found on a chip (block 801) and defines an information area (block 803). The processing logic marks a short area inside the search area (block 805). A short area may indicate total area of all locations inside the search area in which the defect would cause a short failure and can be represented as ShortArea (nm²). A short failure may indicate a connection between two or more portions of the pattern on a chip that should not be connected. After marking the short area, the processing logic calculates a short failure probability (block 807). A short failure probability may indicate a probability of a defect with a given defect size to cause a short failure of the circuitry on which the defect was located. A short failure probability can be represented as ShortProbability ($P_s$).

Figure 9D:
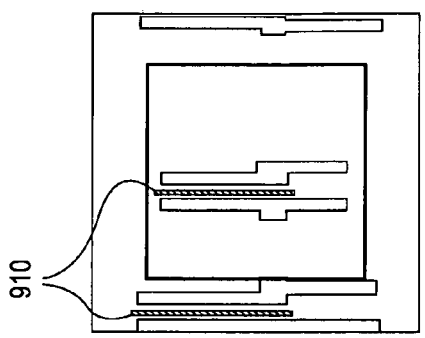
FIGS. 9A-9D illustrate an exemplary short area calculation in accordance with one embodiment of the invention.

An example of marking a short area at block 805 shown in FIG. 8 will be discussed in more detail below in conjunction with FIGS. 9A-9D. FIG. 9A shows a pattern with a defect reported in its proximity. The largest boundary rectangle represents an information area 902. The thick-line rectangle inside the largest boundary rectangle represents a search area 904. The small rectangle placed on the upper left corner of the largest boundary rectangle indicates the size of a defect 906. The search area 904 is derived from the location inaccuracy of the inspection tool in locating the defect. The defect is located at a point in the search area 904. The polygons 908 inside the information area 902 indicate the pattern that is part of a circuit formed on a chip (not shown).

For marking a short area in the search area 904, the processing logic performs an analysis on all the visible areas of the clip, which is, in this embodiment, the information area 902, to avoid edge effects. But the final result of the analysis may be extracted only from the search area 904.

In this embodiment, a morphological image analysis is performed. All the separate polygons 908 are to be differently labeled as differently hatched in FIG. 9B. Labeling may be done with various methods as long as all the separate polygons are separately identified.

Figure 9C:
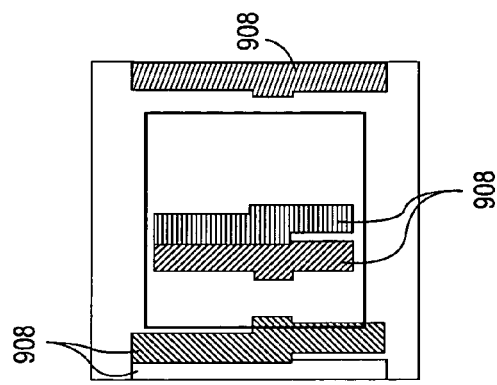
Figure 9B:
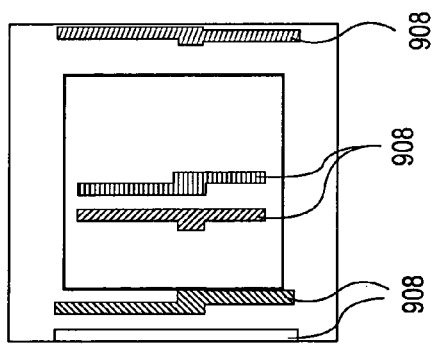
Figure 9A:
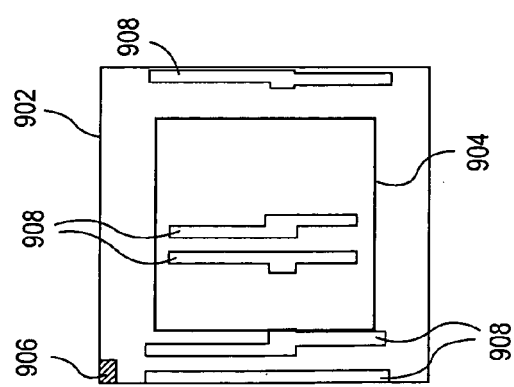

Referring to FIG. 9C, all the labeled separate polygons 908 are to be dilated using a structuring element with dimensions related to the defect size. This dilation enlarges all the labeled separate polygons 908. Note that portions of neighboring polygons overlap each other in FIG. 9C. The overlapping area, i.e., an intersection of the dilated polygons is to be marked as the short area where the defect can cause a short failure. The two thin bars 910 in FIG. 9D shows the short area.

A short failure probability can be determined based on the marked short area, i.e., using the short area and the search area. According to this CF algorithm, the short failure probability is calculated as the ratio between the short area and the search area. In one embodiment, the ratio between the short area and the search area means the ratio of the area of the short area to the area of the search area. In the illustrated example in FIG. 9D, the short failure probability=0.0094.

In order to verify whether the calculated short failure probability is meaningful (whether this CF algorithm is useful), a simulation is employed in which a defect of the same size is thrown 10,000 times in a random location within a search area around 10 different clips on Graphic Display System (GDS). If it happens to short between two separate pattern elements, it is considered a short failure, i.e., a killer failure. The ratio between the resulting short failures and the total number of throws will be compared to the result obtained above by the calculation.

FIGS. 10A-10C illustrate examples of the short failure probability verification experiment. Referring to FIGS. 10A-10C, each of the thick-line rectangles 1004 represents a search area. Each of the largest boundary rectangles 1002 represents an information area for each corresponding search area. The polygons 1008 in each information area represent the pattern on a chip (not shown). Each of thin-line Xs indicates a random location of a simulated defect, and each of thick-line Xs indicates a location in which the simulated defect could cause a short failure. In other words, all of the thick-line Xs in each search area collectively indicate a short area in which the defect could cause a short failure.

It should be noted that no thick-line X is found in FIG. 10C. All the pattern elements in FIG. 10C are pre-connected by routing, and thus, even a defect causing a short failure between two tines will not cause a fatal failure on this circuit. In other words, a short failure in a pattern, in which all the pattern elements are pre-connected by routing is not considered a killer failure. This situation is naturally handled in this CF algorithm by considering only separated polygons in the analysis for marking a short area.

Whether polygons are separated or not may be determined within various boundaries. Separateness may be defined within an information area or within a larger area covering the information area or within the whole area on the chip. If separateness of polygons is defined within an information area, then, for example, one single polygon in the whole area can be recognized as two separate polygons within the information area when the connection between the two polygons is located outside the information area. An appropriate area may be chosen for defining a separateness considering circumstances.

Meanwhile, routing and interface information of a pattern may be used additionally or independently for this CF algorithm. For example, given two polygons that are considered separate only within an information area, and a connection between them being outside the information area, the routing and interface information may be used for labeling them as one single polygon. Outside connectivity can be then taken into account using the routing and interface information.

Figure 11:
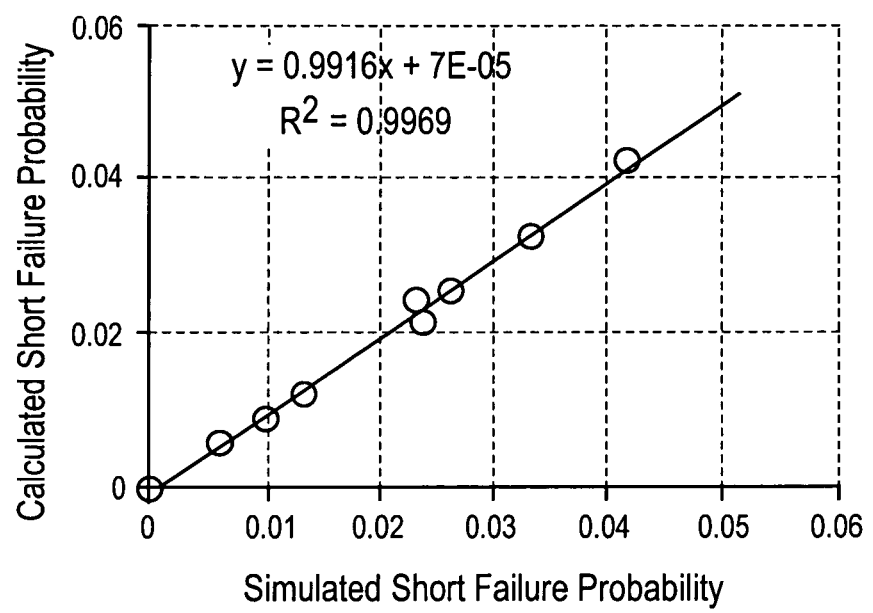
FIG. 11 shows the verification results of the CF algorithm discussed with FIG. 8.

FIG. 11 shows the results of this CF algorithm verification. Calculated short failure probability is plotted as a function of simulated short failure probability. The correlation between the calculated short failure probability and the simulated short failure probability is very strong as shown in FIG. 11.

Figure 12:
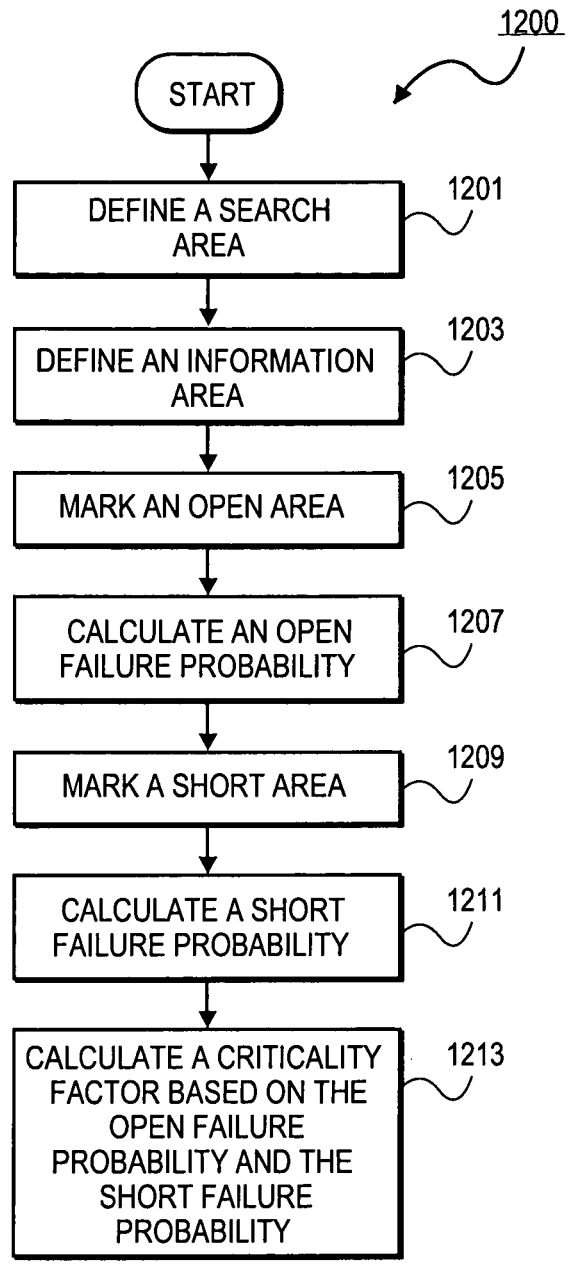
FIG. 12 is a flow diagram of another exemplary CF algorithm in accordance with one embodiment of the invention.

Another exemplary CF algorithm will be explained in accordance with one embodiment of the invention. FIG. 12 is a flow diagram of another exemplary CF algorithm 1200 in accordance with one embodiment of the invention. The algorithm 1200 is performed by processing logic that may comprise hardware (circuitry, dedicated logic, etc.), software (such as is run on a general purpose computer system or a dedicated machine), or a combination of both. In one embodiment, the algorithm 1200 is performed by a system (e.g., the CF determination system 200 of FIG. 2).

Referring to FIG. 12, processing logic defines a search area in which a defect is found on a chip (block 1201) and defines an information area (block 1203). The processing logic marks an open area inside the search area (block 1205). An open area indicates total area of all locations inside the search area in which the defect would cause an open failure and can be represented as OpenArea (nm²). After marking the open area, the processing logic calculates an open failure probability (block 1207). An open failure probability indicates a probability of a defect with a given defect size to cause an open failure of the circuitry on which the defect was located and can be represented as OpenProbability ($P_o$). The processing logic marks a short area inside the search area (block 1209). After marking the short area, the CF algorithm calculates a short failure probability (block 1211). A short failure probability indicates a probability of a defect with a given defect size to cause a short failure of the circuitry on which the defect was located. A short failure probability can be represented as ShortProbability ($P_s$). In this embodiment, calculation of the open failure probability and the short failure probability is performed using method 400 of FIG. 4 and method 800 of FIG. 8. Note that marking a short area at block 1209 and calculating a short failure probability at block 1211 can be performed before marking an open area at block 1205 and calculating an open failure probability at block 1207.

The processing logic calculates a criticality factor using both the open failure probability ($P_o$) and the short failure probability ($P_s$) (block 1213). In this embodiment, the criticality factor, which can be represented as CriticalityFactor ($C_f$), means a killer ratio of a given defect considering both the open failure probability and the short failure probability. An exemplary expression for calculating a CF according to this embodiment is as follows:

$$C_f = 1 - (1-P_s)*(1-P_o)$$

Figure 13:
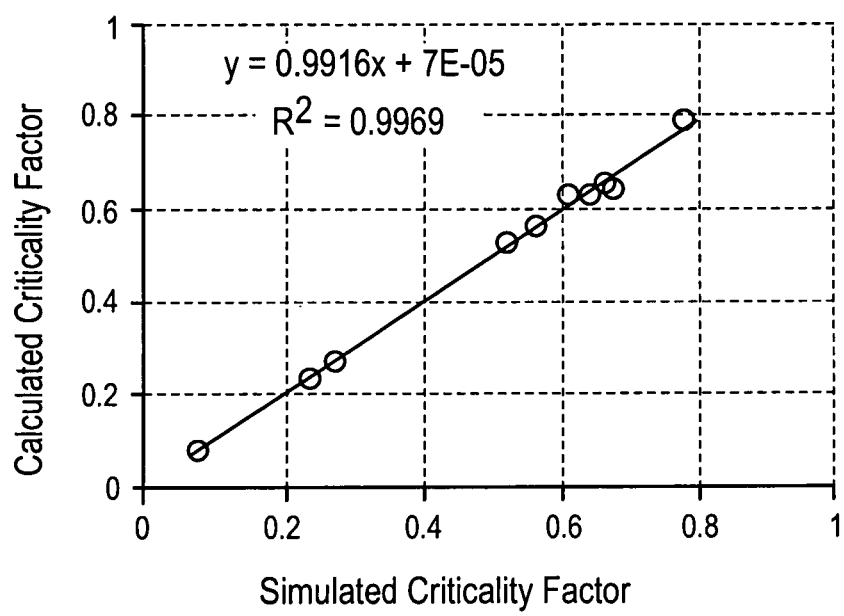
FIG. 13 shows the verification result of the CF algorithm discussed with FIG. 12.

FIG. 13 shows the verification results of this CF algorithm. In order to verify the CF algorithm results, a simulation is employed in which a defect of the same size is thrown 10,000 times in a random location within a Search area around 10 different clips on Graphic Display System (GDS). If the defect causes a short between two separate pattern elements or completely covers some pattern element, it is considered a killer. The ratio between the killers and the total number of throws will be compared to the result obtained above by the calculation. Calculated criticality factor is plotted as a function of simulated criticality factor. The correlation is very strong as seen in FIG. 13.

Two issues may be addressed in the calculation of the criticality factors according to various embodiments above. One is the location error that a defect location reported by inspection tool is typically subject to inaccuracy due to various reasons (mechanics, optics, calibration, etc.). Nevertheless, because the CF algorithms proposed above are rather statistical, the criticality factors can still be accurately calculated and highly reliable, as shown above.

The other issue is the defect size error that a defect size reported by inspection tool is also subject to inaccuracy typically due to resolution limitations of the optical systems, or to distortion of the apparent defect size by scattering properties of the defect material or morphology. Nevertheless, the relation between the reported size and the real size of a defect (for example, as measured by scanning electron microscope (SEM) can be found empirically and thereby significantly reduce this source of error.

Figure 14:
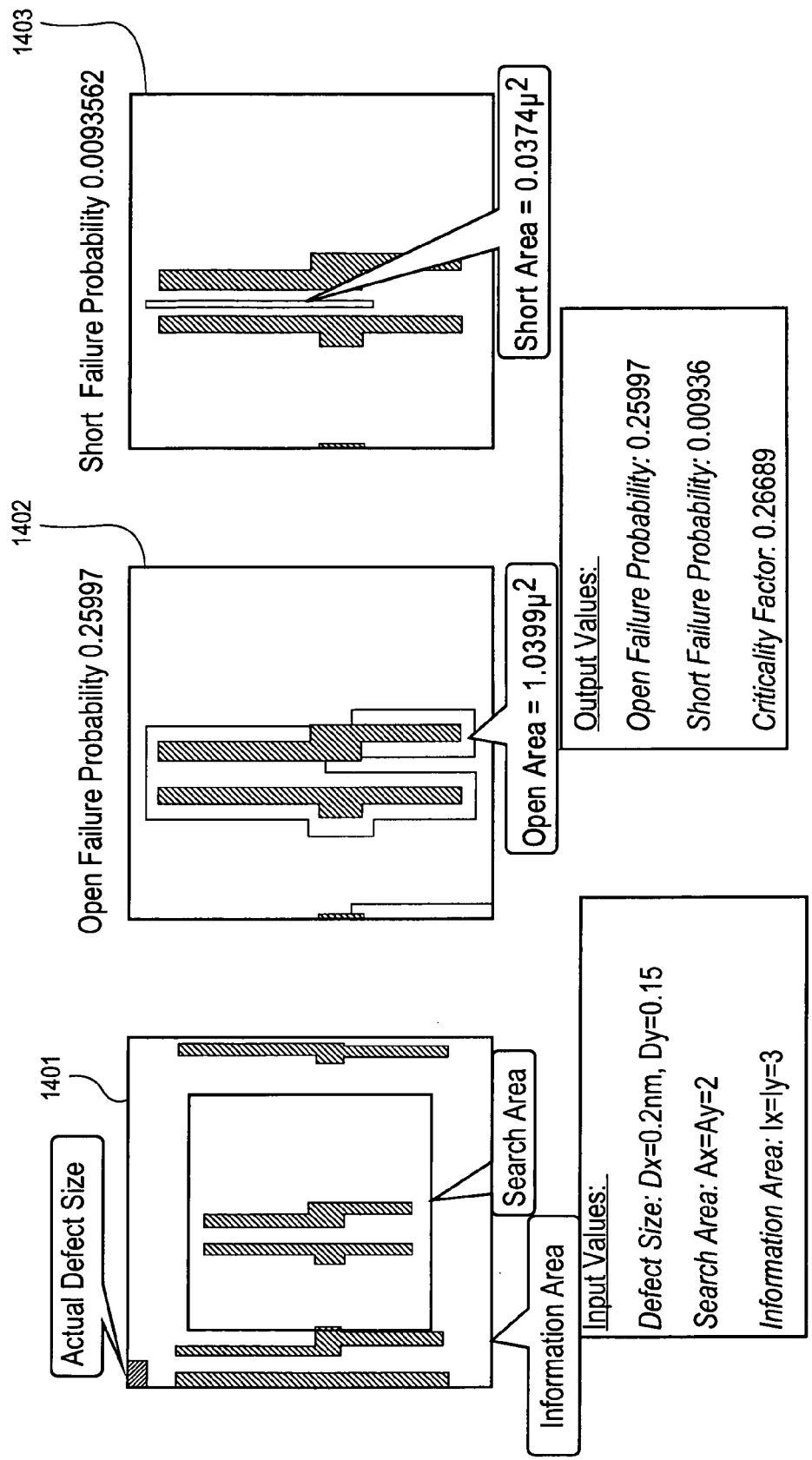
FIG. 14 illustrates exemplary calculation results of open failure probability, short failure probability and criticality factor, in accordance with embodiments of the invention.
Figure 17G:
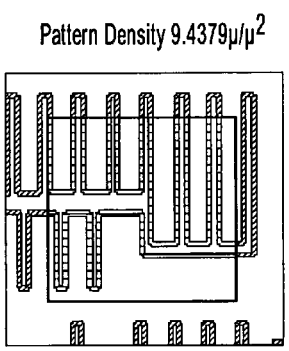
Figure 17H:
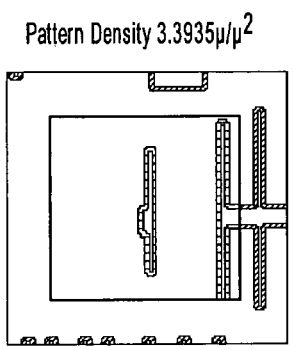
Figure 17I:
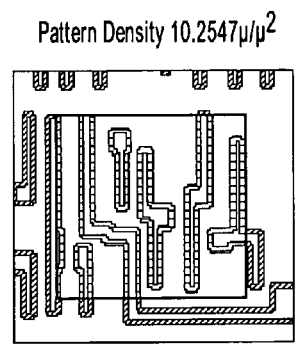

FIG. 14 illustrates exemplary GDS clips used in the calculations discussed above, including the calculations of an open failure probability and a short failure probability and a criticality factor based on the open failure probability and the short failure probability. Block 1401 shows an information area, a search area and a defect. Block 1402 shows an open area, and block 1403 shows a short area. In this illustrative embodiment, the calculated open failure probability is 0.25997, the calculated short failure probability is 0.00936, and the calculated criticality factor based on these two probabilities is 0.26689.

FIGS. 15A-15I illustrate exemplary GDS clips used in the calculations discussed above, including the calculations of an open failure probability and a short failure probability and a criticality factor based on the open failure probability and the short failure probability. Referring to FIGS. 15A-15I, each of the largest boundary rectangles represents an information area. Each of the thick-line rectangles inside the largest boundary rectangles represents a search area. Each of the small rectangles placed on the left upper corner of the left blocks 1511, 1521, 1531, 1541, 1551, 1561, 1571, 1581 and 1591 indicates the size of a defect (It does not indicate the actual defect location.) The hatched polygons inside the left blocks 1511, 1521, 1531, 1541, 1551, 1561, 1571, 1581 and 1591 indicate the pattern that is part of circuitry formed on a chip (not shown). The white polygons inside each of the center blocks 1512, 1522, 1532, 1542, 1552, 1562, 1572, 1582 and 1592 collectively indicate an open area. The white polygons inside each of the right blocks 1513, 1523, 1533, 1543, 1553, 1563, 1573, 1583 and 1593 collectively indicate a short area. No white polygon in a center block means that there is no open area. Likewise, no white polygon in a right block means that there is no short area.

Referring to FIG. 15A, a left lock 1511 shows an information area, a search area and a defect. A center lock 1512 shows an open area, and a right block 1513 shows a short area. In this illustrative embodiment, the calculated open failure probability is 0.076186, the calculated short failure probability is 0, and the calculated criticality factor based on these two probabilities is 0.07619.

Referring to FIG. 15B, a left lock 1521 shows an information area, a search area and a defect. A center lock 1522 shows an open area, and a right block 1523 shows a short area. In this illustrative embodiment, the calculated open failure probability is 0.64402, the calculated short failure probability is 0.012252, and the calculated criticality factor based on these two probabilities is 0.64838.

Referring to FIG. 15C, a left lock 1531 shows an information area, a search area and a defect. A center block 1532 shows an open area, and a right block 1533 shows a short area. In this illustrative embodiment, the calculated open failure probability is 0.54912, the calculated short failure probability is 0.024059, and the calculated criticality factor based on these two probabilities is 0.55997.

Referring to FIG. 15D, a left lock 1541 shows an information area, a search area and a defect. A center block 1542 shows an open area, and a right block 1543 shows a short area. In this illustrative embodiment, the calculated open failure probability is 0.52261, the calculated short failure probability is 0.025395, and the calculated criticality factor based on these two probabilities is 0.53473.

Referring to FIG. 15E, a left lock 1551 shows an information area, a search area and a defect. A center block 1552 shows an open area, and a right block 1553 shows a short area. In this illustrative embodiment, the calculated open failure probability is 0.78102, the calculated short failure probability is 0.042103, and the calculated criticality factor based on these two probabilities is 0.79024.

Referring to FIG. 15F, a left lock 1561 shows an information area, a search area and a defect. A center block 1562 shows an open area, and a right block 1563 shows a short area. In this illustrative embodiment, the calculated open failure probability is 0.65382, the calculated short failure probability is 0.0060147, and the calculated criticality factor based on these two probabilities is 0.65590.

Referring to FIG. 15G, a left lock 1571 shows an information area, a search area and a defect. A center block 1572 shows an open area, and a right block 1573 shows a short area. In this illustrative embodiment, the calculated open failure probability is 0.63088, the calculated short failure probability is 0, and the calculated criticality factor based on these two probabilities is 0.63088.

Referring to FIG. 15H, a left lock 1581 shows an information area, a search area and a defect. A center block 1582 shows an open area, and a right block 1583 shows a short area. In this illustrative embodiment, the calculated open failure probability is 0.23235, the calculated short failure probability is 0, and the calculated criticality factor based on these two probabilities is 0.23235.

Referring to FIG. 15I a left lock 1591 shows an information area, a search area and a defect. A center block 1592 shows an open area, and a right block 1593 shows a short area. In this illustrative embodiment, the calculated open failure probability is 0.61885, the calculated short failure probability is 0.021386, and the calculated criticality factor based on these two probabilities is 0.62700.

Data used for examples in FIGS. 15A-15I include user parameters, and inputs and outputs as interface requirements. The user parameters include SearchArea, InformationArea, OpenProbability, ShortProbability and CriticalityFactor. The range of expected values for the user parameters is as follows:

| Element | Range |
| --- | --- |
| SearchArea | 1-5 μm (default = 2 μm) |
| InformationArea | 2-5 μm (default = 3 μm) |
| OpenProbability | 0-1 |
| ShortProbability | 0-1 |
| CriticalityFactor | 0-1 |
| Number of XY defects | 10,000-1,000,000 |

As interface requirements, the input includes CAD files, index list of the CAD layer/s of interest, CAD data type to operate on, a defects list and parameters. The defect list includes DefectID, LocationXY, DefectSize and DefectDieIndex. The parameters include SearchArea and InformationArea. DefectID represents a numeric ID of a given defect, DefectSize represents a size of a defect as reported by inspection tool or with correction. In one embodiment, an analytic function of relation between the estimated defect size reported by inspection tool and the actual defect size as measured in SEM can be applied for correction. XY location represents coordinates of a defect on CAD. DefectDieIndex represents die index in which a defect was found.

As interface requirements, the output includes OpenProbability, ShortProbability, and CriticalityFactor assigned to each defect from the defect list. Defect limited yield (visual defects only) can be calculated per each inspected die/wafer/lot.

Output Files include defect table in which OpenProbability, ShortProbability and CriticalityFactor for each defect from the defect list are written. A sample table is as follows:

| DefectID | WaferID | LotID | OpenProbability | ShortProbability | CriticalityFactor |
| --- | --- | --- | --- | --- | --- |
| 1 | 1 | 1 | 0.2 | 0.8 | 0.84 |
| 2 | 1 | 1 | 0.35 | 0.225 | 0.49 |
| 3 | 1 | 1 | 0.008 | 0.004 | 0.12 |

An exemplary algorithm for calculating a pattern density will now be discussed in more detail. FIGS. 16A-16B illustrate an exemplary pattern density calculation, in accordance with one embodiment of the invention.

FIG. 16A shows pattern boundary with a defect reported in its proximity. The largest boundary rectangle represents an information area 1602. The thick-line rectangle inside the largest boundary rectangle represents a search area 1604. For a pattern density to be determined by this exemplary algorithm, a pattern boundary length should be found. In this embodiment, the pattern boundary length represents total length of all the pattern boundaries inside the search area 1604. To avoid edge effects, analysis is performed on all the visible areas of the clip, which is, in this embodiment, the information area 1602. However, the final result of the analysis may be extracted only from the search area 1604. In this embodiment, the analysis is performed using a morphological image analysis. The algorithm marks all the pattern boundaries in the information area 1602. FIG. 16A shows the marked pattern boundaries of thick-line bands 1603 around the pattern elements. The algorithm measures the total length of the marked pattern boundaries as the pattern boundary length, which are found only inside the search area 1604. FIG. 16B shows the marked pattern boundaries 1606 inside the search area 1604. The algorithm calculates a pattern density using the pattern boundary length and the search area. In this embodiment, the pattern density represents the ratio between the pattern boundary length and the search area. In the illustrated example in FIG. 16B, pattern boundary length=$15.99\mu$, search area=$4\mu^2$, and pattern density=$3.95783\mu/\mu^2$.

FIGS. 17A-17I show exemplary GDS clips used for calculating a pattern density. Each of the largest boundary rectangles 1702 represents an information area. Each of the thick-line rectangles 1704 inside the largest boundary rectangles represents a search area. The pattern boundaries around the pattern elements are marked as a hatched thick-line bands in each search area. Each of the calculated pattern densities in FIGS. 17A-17I represents the ratio between each corresponding pattern boundary length and each corresponding search area.

Figure 18:
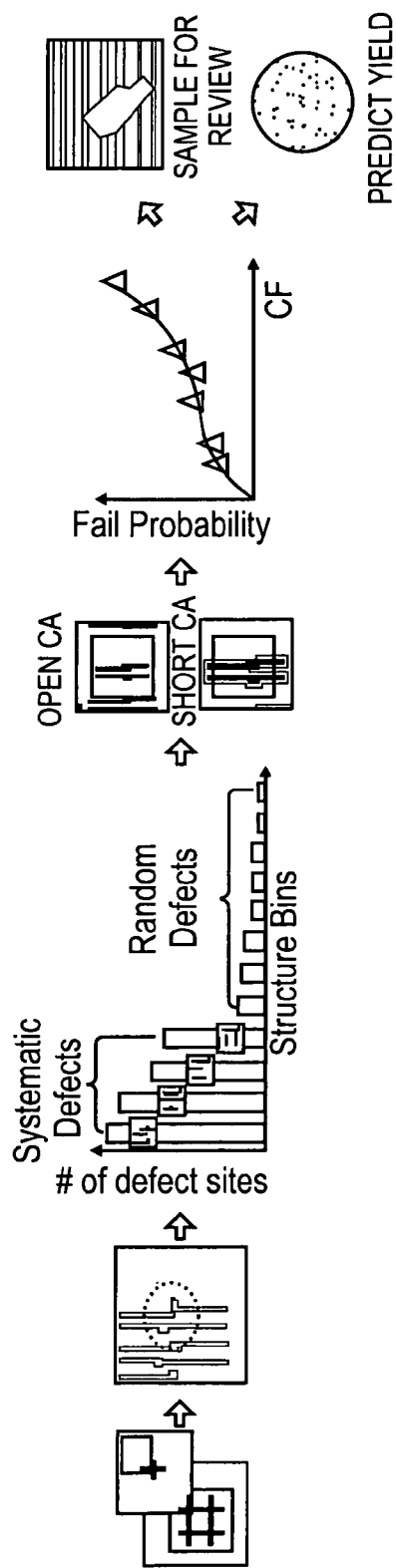
FIG. 18 illustrates a yield prediction methodology using criticality factor according to the present invention.

FIG. 18 illustrates a yield prediction methodology using a criticality factor according to the present invention. According to the methodology, after aligning inspection to GDS, defects are associated with structures. Then, separation of in-line defects into random and systematic classes is performed using design-based binning and random defects are prioritized according to a criticality factor (CF) in the present invention. Then, sampling for review of random defects is conducted based on their CF, and dynamic yield prediction model based on the CF class.

The strength of the dynamic yield prediction based on the CF-based classification scheme is in its completeness: once the training set spans the entire CF range, no new defect class will arise and require retraining.

Figure 19:
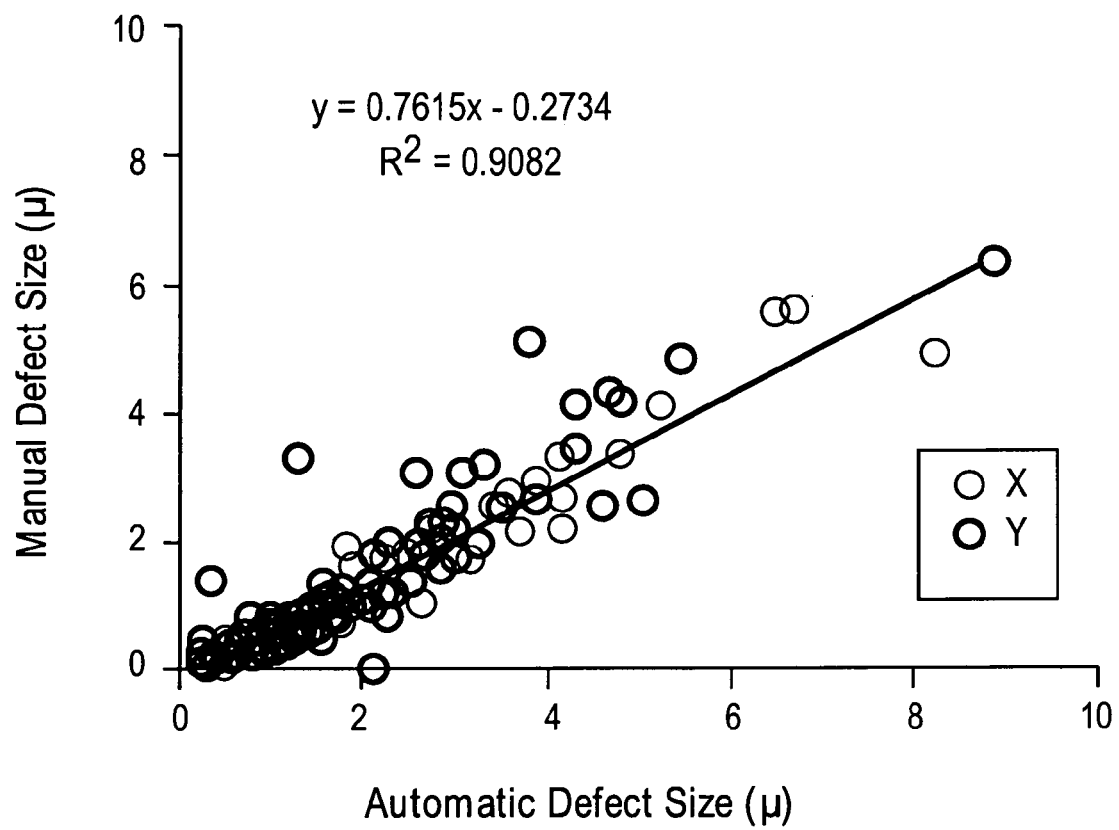
FIG. 19 shows a correlation between the inspection-reported defect size and manually measured size from SEM review images.

Because accurate defect size estimation is crucial, the inspection-reported defect size is correlated to manually measured size from SEM review images. The relation is found linear for both vertical and horizontal defect dimensions as shown in FIG. 19. The corrected size can be used in all subsequent calculations.

FIG. 20 shows a correlation between fail probability and CF in accordance with embodiments of the present invention. The relation between the probability of defects to cause a short or open failure, and their CF can be investigated based on geometric considerations alone. Referring to FIG. 20, after the systematic pattern defects are removed from the dataset, an increasing trend of the fail probability as a function of CF is found. This demonstrates that CF is a valid metric for prioritization of random defects in terms of their yield impact.

Figure 21:
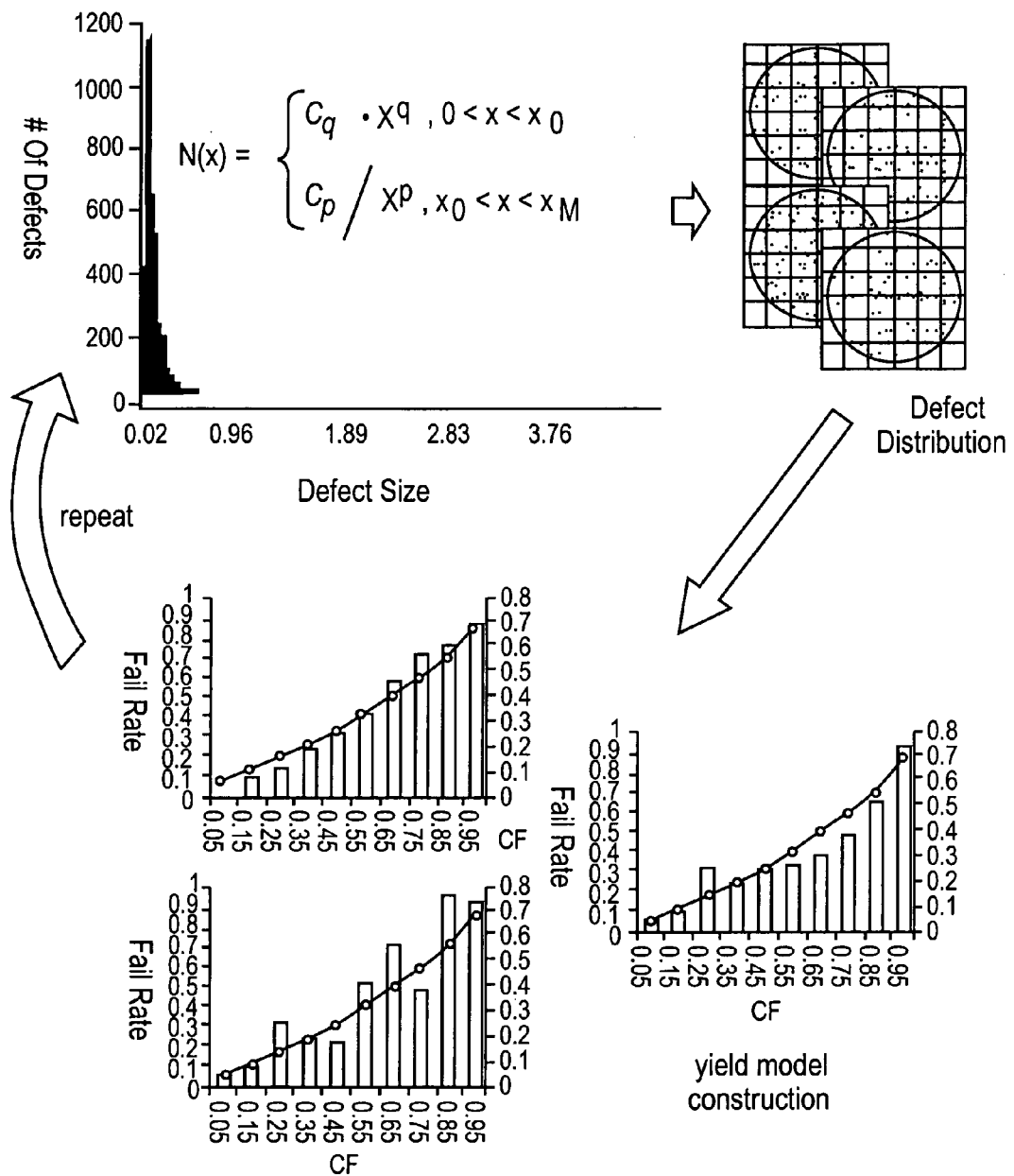
FIG. 21 shows synthetic data generation and experiment flow for yield prediction accuracy estimation in accordance with the methodology illustrated in FIG. 18.

FIG. 21 shows a synthetic data generation and an experiment flow for yield prediction accuracy estimation. To test the accuracy of the dynamic yield prediction model on a synthetic dataset, defects of a typical size are thrown 12,000 times on 20 wafers, across die locations, dies, wafers, and layers. Then, a CF is calculated for all the defects and yield impact based on geometric considerations. Then, a yield model is constructed on a training subset of 15 wafers. After a certain non-defect related yield loss value is assumed, the predicted yield accuracy on the remaining test set of 5 wafers is tested. Those processes can be repeated ten times varying the non-defect related yield loss component in order to span the final yield range.

Figure 22:
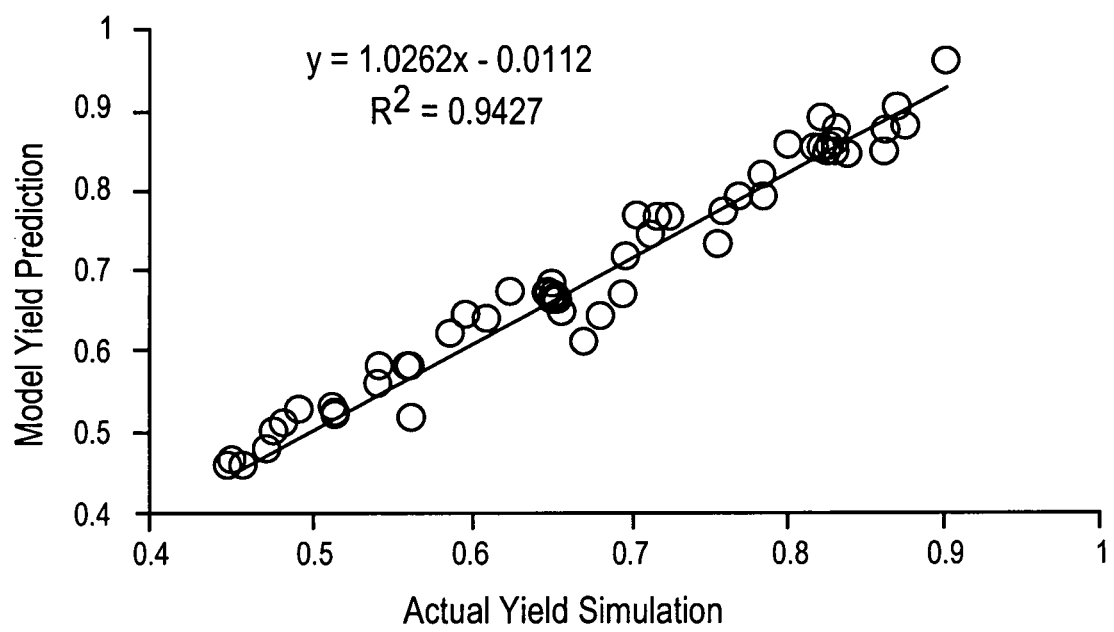
FIG. 22 shows the result of the experiment schematically described in FIG. 21.

FIG. 22 shows the result of the experiment schematically described in FIG. 21. The result demonstrates excellent yield prediction accuracy—the correlation between actual simulation yield and model prediction yield is very strong.

As discussed above, the present invention provides method and apparatus for determining factors to be used in yield prediction for design elements to be considered. More specifically, a criticality factor and/or pattern density can substantially reflect the relationship between defects and the patterns on chips (design layout), and thereby, a more precise and useful yield analysis can be achieved.

Figure 23:
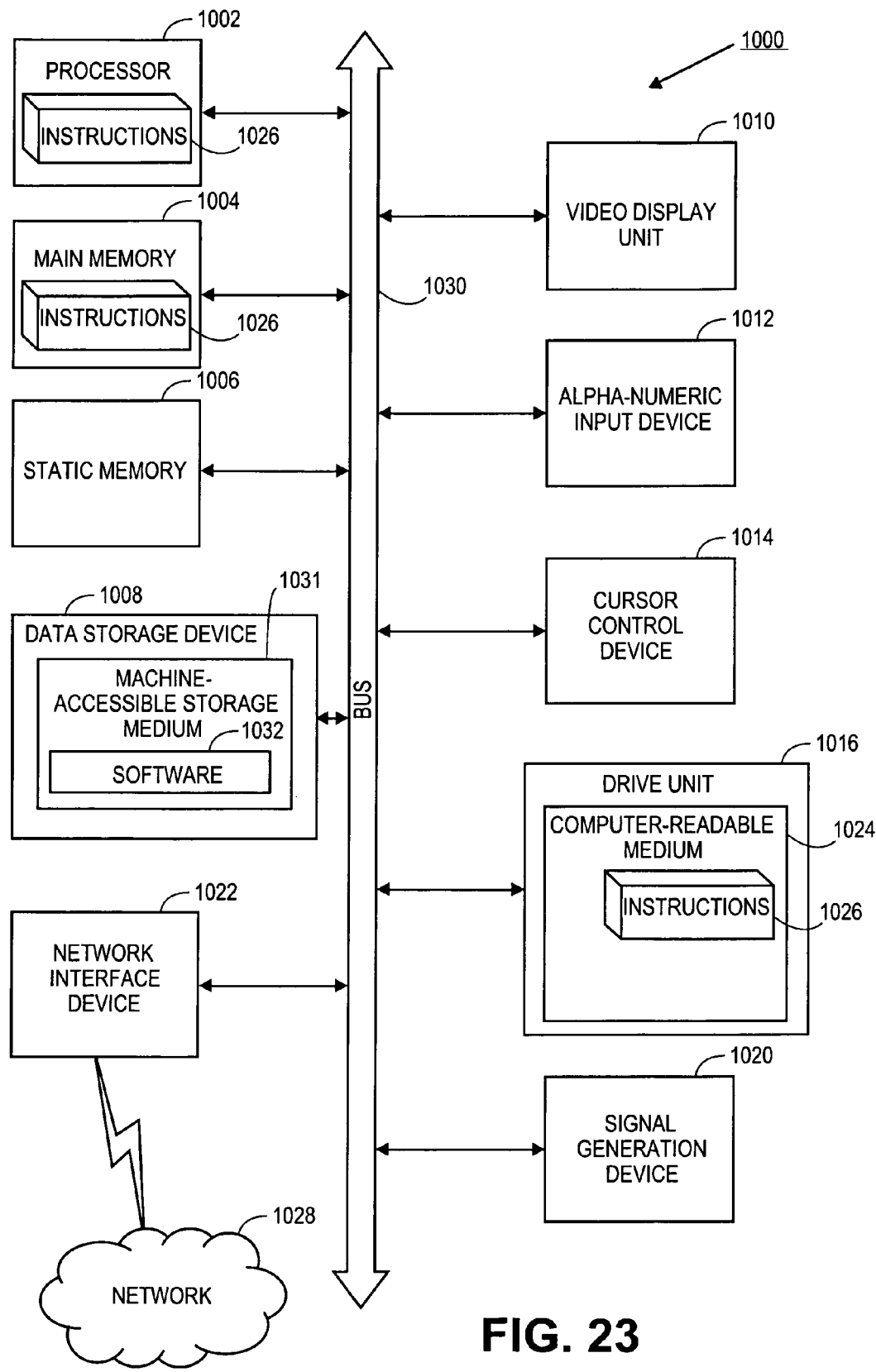
FIG. 23 illustrates a diagrammatic representation of a machine in the exemplary form of a computer system in accordance with the present invention.

FIG. 23 illustrates a diagrammatic representation of a machine in the exemplary form of a computer system 1000 within which a set of instructions, for causing the machine to perform any algorithms or methodology discussed herein, may be executed. In alternative embodiments, the machine may be connected (e.g., networked) to other machines in a LAN, a WAN, an intranet, an extranet, the Internet, or a wireless network. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any other machines capable of executing a set of instructions (sequential or combinational or otherwise) that specify actions to be taken by that machine. Executing the set of instructions are performed sequentially or by multitasking or by threading. Further, while only a single machine is illustrated, the term "machine" shall also be taken to include any collection of machines that individually or jointly execute a set (or multiple sets) of instructions to perform any algorithms or methodology discussed herein.

The exemplary computer system 1000 includes a processing device (processor) 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1008, which communicate with each other via a bus 1030.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1002 may also be one or more special-purpose processing devices such as an application specific integrated circuit (ASIC), a field programmable gate array (FPGA), a digital signal processor (DSP), network processor, or the like. The processor 1002 is configured to execute the instructions 1026 for performing the operations and steps discussed herein.

The computer system 1000 may further include a network interface device 1022 to communicate via a network 1028. The computer system 1000 also may include a video display unit 1010 (e.g., a cathode ray tube (CRT) or a liquid crystal display (LCD) or plasma display panel (PDP) or thin-film transistor displays (TFT), or organic light-emitting diode (OLED), or nanocrystal displays, etc.), an alphanumeric input device 1012 (e.g., a keyboard) and a cursor control device 1014 (e.g., a mouse). The alphanumeric input device 1012 and/or the cursor control device 1014 may be implemented as a touch screen on the display unit 1010. The data storage device 1008 may include a machine-accessible storage medium 1031 on which is stored one or more sets of instructions (e.g., software 1032) embodying any one or more of the methodologies or functions described herein. The software 1032 may also reside, completely or at least partially, within the main memory 1004 and/or within the processor 1002. In other words, during execution thereof by the computer system 1000, the main memory 1004 and the processor 1002 also constitute machine-accessible storage media. The software 1032 may further be transmitted or received over a network 1028 via the network interface device 1022 and/or signal generating device 1020.

The machine-accessible storage medium 1031 may also be used to store data structure sets that define user identifying states and user preferences that define user profiles. Data structure sets and user profiles may also be stored in other sections of computer system 1000, such as static memory 1006.

While the machine-accessible storage medium 1031 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for determining factors for design consideration in yield analysis of semiconductor fabrication, the computer-implemented method comprising:
    obtaining a geometric characteristic of an in-line defect on a chip;
    obtaining design data of the chip including defining a search area where the in-line defect is located on the chip, the design data associated with the in-line defect, wherein the design data includes a design layout within the search area on which the in-line defect was found and routing information of the design layout on which the in-line defect was found;
    determining a pattern density within the search area around the in-line defect based on the geometric characteristic and the design data;
    determining, by a criticality factor determination system, a criticality factor of the in-line defect based on the geometric characteristic and the design data within the search area, the criticality factor indicating a likelihood of the in-line defect to cause a failure of the chip; and
    outputting the criticality factor; and
    outputting the pattern density, wherein the in-line defect on the chip is inspected and reported by an inspection tool.

2. The computer-implemented method of claim 1, wherein obtaining the design data comprises:
    marking an open area inside the search area, wherein the open area indicates an area where the in-line defect may cause an open failure, and
    determining the criticality factor comprises:
    calculating an open failure probability as the criticality factor, wherein the open failure probability is a ratio between the open area and the search area.

3. The computer-implemented method of claim 2, wherein marking the open area comprises:
    identifying pattern elements larger than the in-line defect in the search area;
    subtracting the identified pattern elements from the original pattern elements in the search area; and
    identifying an area that covers the remaining pattern elements as the open area.

4. The computer-implemented method of claim 1, wherein obtaining the design data comprises:
    marking a short area inside the search area, wherein the short area indicates an area where the in-line defect may cause a short failure, and
    determining the criticality factor comprises:
    calculating a short failure probability as the criticality factor, wherein the short failure probability is a ratio between the short area and the search area.

5. The computer-implemented method of claim 4, wherein marking the short area comprises:
    labeling all separate polygons in an area covering the search area, wherein the separate polygons do not overlap and are identified in the design data;
    enlarging all the labeled separate polygons until neighboring polygons of the labeled separate polygons are overlapped; and
    identifying an overlapped area as the short area, wherein the overlapped area is an area that the neighboring polygons of the labeled separate polygons overlap.

6. The computer-implemented method of claim 1, wherein obtaining the design data comprises:
    marking an open area inside the search area, wherein the open area indicates an area where the in-line defect may cause an open failure; and
    marking a short area inside the search area, wherein the short area indicates an area where the in-line defect may cause a short failure, and
    determining the criticality factor comprises:
    calculating an open failure probability that is a ratio between the open area and the search area;
    calculating a short failure probability that is a ratio between the short area and the search area; and
    calculating the criticality factor based on the open failure probability and the short failure probability.

7. The computer-implemented method of claim 6, wherein calculating the criticality factor comprises:
    calculating the criticality factor based on the open failure probability and the short failure probability as follows:

$$Cf=1-(1-Ps)*(1-Po)$$

where Cf represents the criticality factor, Ps represents the short failure probability, and Po represents the open failure probability.

8. The computer-implemented method of claim 1, wherein obtaining the design data comprises:

finding a length of all pattern boundaries inside the search area, and determining the pattern density comprises:

calculating a ratio between the length of all the pattern boundaries and the search area as the pattern density.

9. The computer-implemented method of claim 1, wherein the geometric characteristic of the defect includes at least one of a size and a location of the defect.

10. An apparatus for determining factors for design consideration in yield analysis of semiconductor fabrication, the apparatus comprising:

a data obtainer to obtain a geometric characteristic of an in-line defect on a chip and design data of the chip including defining a search area where the in-line defect is located on the chip, the design data associated with the in-line defect, wherein the design data includes a design layout within the search area on which the defect was found and routing information of the design layout on which the in-line defect was found;

a pattern density calculator, coupled with the data obtainer, to determine a pattern density of the search area around the in-line defect based on the geometric characteristic and the design data;

a criticality factor calculator, coupled with the data obtainer, to determine a criticality factor of the in-line defect based on the geometric characteristic and the design data within the search area, wherein the criticality factor indicating a likelihood of the in-line defect to cause a failure of the chip; and a criticality factor reporter, coupled with the criticality factor calculator, to output the criticality factor; and a pattern density reporter, coupled with the pattern density calculator, to output the pattern density, wherein the in-line defect on the chip is inspected and reported by an inspection tool.

11. The apparatus of claim 10, wherein the data obtainer is further to mark an open area inside the search area, the open area indicating an area where the in-line defect may cause an open failure; and the criticality factor calculator is further to calculate an open failure probability as the criticality factor, the open failure probability being a ratio between the open area and the search area.

12. The apparatus of claim 11, wherein the data obtainer is further to identify pattern elements larger than the in-line defect in the search area, subtract the identified pattern elements from the original pattern elements in the search area, and identify an area that covers the remaining pattern elements as the open area.

13. The apparatus of claim 10, wherein the data obtainer is further to mark a short area inside the search area, wherein the short area indicates an area where the in-line defect may cause a short failure, and the criticality factor calculator is further to calculate a short failure probability as the criticality factor, wherein the short failure probability is a ratio between the short area and the search area.

14. The apparatus of claim 13, wherein the data obtainer is further to label all separate polygons in an area covering the search area, enlarge all the labeled separate polygons until neighboring polygons of the labeled separate polygons are overlapped, wherein the separate polygons do not overlap and are identified in the design data, and identify an overlapped area as the short area, wherein the overlapped area is an area that the neighboring polygons of the labeled separate polygons overlap.

15. The apparatus of claim 10, wherein the data obtainer is further to mark an open area inside the search area, wherein the open area indicates an area where the in-line defect may cause an open failure, and mark a short area inside the search area, wherein the short area indicates an area where the in-line defect may cause a short failure, and the criticality factor calculator is further to calculate an open failure probability that is a ratio between the open area and the search area, calculate a short failure probability that is a ratio between the short area and the search area, and calculate the criticality factor based on the open failure probability and the short failure probability.

16. The apparatus of claim 15, wherein the criticality factor calculator calculates the criticality factor as follows:

$$Cf=1-(1-Ps)*(1-Po)$$

where Cf represents the criticality factor, Ps represents the short failure probability, and Po represents the open failure probability.

17. A non-transitory computer readable storage medium containing computer instructions which are executed by a computer to cause the computer to perform a method for determining factors for design consideration in yield analysis of semiconductor fabrication, the method comprising:

obtaining a geometric characteristic of an in-line defect on a chip;

obtaining design data of the chip including defining a search area where the in-line defect is located on the chip, the design data associated with the in-line defect, wherein the design data includes a design layout within the search area on which the in-line defect was found and routing information of the design layout on which the in-line defect was found;

determining a pattern density within the search area around the in-line defect based on the geometric characteristic and the design data;

determining a criticality factor of the in-line defect based on the geometric characteristic and the design data within the search area, the criticality factor indicating a likelihood of the in-line defect to cause a failure of the chip; and outputting the criticality factor; and outputting the pattern density, wherein the in-line defect on the chip is inspected and reported by an inspection tool.

18. The non-transitory computer readable storage medium of claim 17, wherein obtaining the design data comprises:

marking an open area inside the search area, wherein the open area indicates an area where the in-line defect may cause an open failure; and marking a short area inside the search area, wherein the short area indicates an area where the in-line defect may cause a short failure, and determining the criticality factor comprises:

calculating an open failure probability that is a ratio between the open area and the search area;

calculating a short failure probability that is a ratio between the short area and the search area; and calculating the criticality factor based on the open failure probability and the short failure probability as follows:

$$Cf=1-(1-Ps)*(1-Po)$$

where Cf represents the criticality factor, Ps represents the short failure probability, and Po represents the open failure probability.

* * * * *